US012810560B2

(12) United States Patent
Choo et al.

(10) Patent No.: US 12,810,560 B2
(45) Date of Patent: Nov. 24, 2026

(54) REALISTIC CONTENT PROVISION DEVICE AND REALISTIC CONTENT PROVISION METHOD

(71) Applicant: LG ELECTRONICS INC., Seoul (KR)

(72) Inventors: Zhimin Choo, Seoul (KR); Inyoung Hwang, Seoul (KR); Kyoungha Lee, Seoul (KR); Jieun Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 18/854,581

(22) PCT Filed: Dec. 8, 2022

(86) PCT No.: PCT/KR2022/019936
§ 371 (c)(1),
(2) Date: Oct. 7, 2024

(87) PCT Pub. No.: WO2023/195596
PCT Pub. Date: Oct. 12, 2023

(65) Prior Publication Data

US 2025/0278901 A1 Sep. 4, 2025

(30) Foreign Application Priority Data

Apr. 8, 2022 (KR) ........................ 10-2022-0044045

(51) Int. Cl.
*G06T 19/00* (2011.01)
*G06T 5/50* (2006.01)
*G06T 19/20* (2011.01)

(52) U.S. Cl.
CPC .............. *G06T 19/006* (2013.01); *G06T 5/50* (2013.01); *G06T 19/20* (2013.01); *G06T 2207/20221* (2013.01); *G06T 2219/2004* (2013.01)

(58) Field of Classification Search
None
See application file for complete search history.

(56) References Cited

U.S. PATENT DOCUMENTS 9,906,769 B1 * 2/2018 Young .................... H04N 23/90
2014/0071163 A1 3/2014 Kinnebrew et al.
(Continued)

FOREIGN PATENT DOCUMENTS

JP 2018-125689 A 8/2018
KR 10-2019-0070616 A 6/2019
(Continued)

*Primary Examiner* — Yi Wang
(74) *Attorney, Agent, or Firm* — Birch, Stewart, Kolasch & Birch, LLP

(57) ABSTRACT

A realistic content provision device and a method thereof are disclosed. A realistic content provision device according to the present disclosure comprises: a communication module configured to communicate with a cloud server and receive sensing information and surrounding image information from one or more sensors arranged around a swimming pool; and a memory for storing a realistic content and 3D data related thereto. In addition, the device may: process, on the basis of the received sensing information, the realistic content matching the surrounding image information, so as to correspond to multiple recognizable user points of view with reference to the location of a moving object having approached around the swimming pool; and perform rendering to output the processed realistic content on a surface of water of the swimming pool in an augmented reality. In this case, the surrounding image information may be edited, (Continued)

combined, and updated to be connected to an actual background and projected.

10 Claims, 15 Drawing Sheets

(56) References Cited

U.S. PATENT DOCUMENTS

| | | | | |
|---|---|---|---|---|
| 2018/0032031 | A1 | 2/2018 | Du | |
| 2019/0087548 | A1* | 3/2019 | Bennett | E04H 4/1654 |
| 2020/0246690 | A1* | 8/2020 | Weitzman | G06V 40/16 |
| 2021/0199981 | A1 | 7/2021 | Lee | |
| 2021/0390305 | A1 | 12/2021 | MacWilliams et al. | |

FOREIGN PATENT DOCUMENTS

| | | | |
|---|---|---|---|
| KR | 10-2019-0105274 | A | 9/2019 |
| KR | 10-2019-0130147 | A | 11/2019 |
| WO | WO 2014/022591 | A1 | 2/2014 |

* cited by examiner (a)

(b)

(a)

(b)

REALISTIC CONTENT PROVISION DEVICE AND REALISTIC CONTENT PROVISION METHOD

CROSS REFERENCE TO RELATED APPLICATIONS

This application is the National Phase of PCT International Application No. PCT/KR2022/019936, filed on Dec. 8, 2022, which claims priority under 35 U.S.C. 119(a) to Patent Application No. 10-2022-0044045, filed in the Republic of Korea on Apr. 8, 2022, all of which are hereby expressly incorporated by reference into the present application.

TECHNICAL FIELD

The present disclosure relates to a realistic content provision device and a realistic content provision method, and more particularly, to a realistic content provision device and a realistic content provision method that can interact with surrounding objects or environments based on various sensing data items.

BACKGROUND ART

Augmented reality (AR) technology is a method of applying a virtual digital image or video to the real world. This is different from virtual reality (VR), which shows a graphic image while blindfolded, in that an observer can see the real world with his or her eyes.

The augmented reality (AR) technology provides a sense of immersion in content to observers in the real world. Recently, in order to increase a sense of immersion, various types of technologies of providing 3D content using augmented reality (AR) technology are being studied.

Meanwhile, as the leisure population using hotels, outdoor swimming pools or the like has increased in recent years, various efforts are being made to provide new spatial experiences to users in order to create signature spots that people want to visit again.

DISCLOSURE OF INVENTION

Technical Problem

Accordingly, according to some embodiments of the present disclosure, an object thereof is to provide a realistic content provision device and a realistic content provision method that can interact with surrounding objects or environments based on various sensing data items acquired by various sensors in the vicinity of a swimming pool.

Furthermore, according to some embodiments of the present disclosure, an object thereof is to provide a realistic content provision device and a realistic content provision method that can provide a new sense of space and an experience as if floating in the air, no matter where an observer looks from in a swimming pool in consideration of various viewpoints.

Solution to Problem

A realistic content provision device according to the present disclosure may acquire various sensing data and surrounding image information captured from various angles, and project realistic content connected to the surrounding environment, thereby providing a new experience as if being in a space located in the air and having a transparent floor.

Furthermore, such a spatial experience may be implemented to provide realistic content processed to have various viewpoints so as to allow an observer to feel it no matter where he or she is located in the vicinity of a swimming pool.

Specifically, a realistic content provision device according to an embodiment of the present disclosure may include a communication module configured to communicate with a cloud server and receive sensing information and surrounding image information from one or more sensors disposed in the vicinity of a swimming pool; a memory that stores realistic content and 3D data related thereto; and a processor that processes realistic content that matches the surrounding image information to correspond to a user viewpoint that can be recognized with respect to a location of a mobile object that has approached the vicinity of the swimming pool based on the received sensing information, and renders the processed realistic content to be output in augmented reality on an underwater surface of the swimming pool.

In an embodiment, the sensing information may be acquired through at least one of a vision sensor, an environmental sensor, and an audio sensor disposed outside the swimming pool, and a temperature sensor, an acceleration sensor, an ultrasonic sensor, and a water pressure sensor disposed inside the swimming pool, wherein the surrounding image information is acquired through one or more background acquisition camera sensors disposed on an outer wall of a structure where the swimming pool is disposed or an outer wall of a surrounding structure.

In an embodiment, the realistic content that matches the surrounding image information may be a composite image for multi-view image information on the shape of a background structure in the vicinity of the structure in which the swimming pool is disposed, acquired through the one or more background acquisition camera sensors.

In an embodiment, the processor may process a composite image for an image in which part of the shape of the background structure is shown to extend to the underwater surface of the swimming pool, as a composite image for multi-view image information, so as to render the composite image to be output in augmented reality on at least one of a side surface and a floor surface under water in the swimming pool.

In an embodiment, the processor may acquire a plurality of image information items corresponding to a plurality of user viewpoints captured through a plurality of external cameras through the communication module, extract partial image data from the acquired plurality of image information items, respectively, and combine the respective extracted partial image data to perform the processing.

In an embodiment, the combination of the respective partial image data may be implemented such that an image at a corresponding viewpoint is incident according to the location of the mobile object.

In an embodiment, the processor may control an image corresponding to a user viewpoint that looks directly at the ground from above acquired by at least one of the plurality of external cameras to be transmitted on the basis of the mobile object being recognized to be located inside underwater in the swimming pool based on the sensing information so as to be output in augmented reality on an underwater surface of the swimming pool.

In an embodiment, the processor may control a composite image for respective images from different user viewpoints acquired by at least two of the plurality of external cameras to be generated and transmitted on the basis of the mobile object being recognized to be located outside underwater in the swimming pool based on the sensing information so as to be output in augmented reality on an underwater surface of the swimming pool.

In an embodiment, the processor may generate, according to the location of the mobile object, a first composite image such that images from a plurality of user viewpoints corresponding thereto are incident, and generate a second composite image with respect to the first composite image on the basis of image information collected through the cloud server or the memory.

In an embodiment, the processor may render realistic content that matches the surrounding image information to be output in augmented reality through a light field (LF) display assembly including one or more LF display modules disposed on an underwater surface of the swimming pool, and the one or more LF display modules may be configured to provide realistic content corresponding to the surrounding image information in a space inside the swimming pool to a mobile object that has approached the vicinity of the swimming pool.

In addition, a realistic content provision method according to an embodiment of the present disclosure may be implemented by performing the following steps. The method may include receiving sensing information and surrounding image information from one or more sensors disposed in the vicinity of a swimming pool; processing, based on the received sensing information, realistic content that matches the surrounding image information to correspond to a user viewpoint that can be recognized with respect to the location of a mobile object that has approached the vicinity of the swimming pool; and rendering the processed realistic content to be output in augmented reality on an underwater surface of the swimming pool.

In an embodiment, the receiving of the sensing information and the surrounding image information may include acquiring the sensing information through at least one of a vision sensor, an environmental sensor, and an audio sensor disposed outside the swimming pool, and a temperature sensor, an acceleration sensor, an ultrasonic sensor, and a water pressure sensor disposed inside the swimming pool; and acquiring the surrounding image information through one or more background acquisition camera sensors disposed on an outer wall of a structure where the swimming pool is disposed or an outer wall of a surrounding structure.

In an embodiment, the processing of the realistic content may include generating a composite image for multi-view image information on the shape a background structure in the vicinity of the structure in which the swimming pool is disposed, acquired through the one or more background acquisition camera sensors.

In an embodiment, the processing of the realistic content may include processing a composite image for an image in which part of the shape of the background structure is shown to extend to the underwater surface of the swimming pool, as a composite image for the multi-view image information, and the rendering step may include rendering the composite image to be output in augmented reality on at least one of a side surface and a floor surface under water in the swimming pool.

In an embodiment, the receiving of the sensing information and the surrounding image information may include acquiring a plurality of image information items corresponding to a plurality of user viewpoints captured through a plurality of external cameras, and the processing of the realistic content may include extracting partial image data from the acquired plurality of image information, respectively, and combining the respective extracted partial image data to performing the processing.

In an embodiment, the combination of the respective partial image data may be implemented such that an image at a corresponding viewpoint is incident for each location of the mobile object.

Advantageous Effects of Invention

According to a realistic content provision device and a realistic content provision method in accordance with some embodiments of the present disclosure, responsive realistic content that can interact with surrounding objects or environments may be provided based on various sensing data items acquired by various sensors in the vicinity of a swimming pool, thereby providing a new spatial experience to an observer.

Furthermore, according to a realistic content provision device and a realistic content provision method in accordance with some embodiments the present disclosure, a background image connected to a structure in the vicinity of the swimming pool in consideration of various viewpoints may be transmitted to an underwater surface, thereby providing the observer with a sense of space and an experience as if floating in the air, no matter where he or she is in the swimming pool.

In addition, according to a realistic content provision device and a realistic content provision method in accordance with some embodiments of the present disclosure, observer-customized responsive realistic content may be additionally provided together with image information from various viewpoints, thereby providing a completely new spatial experience and fun to a guest using the swimming pool.

MODE FOR THE INVENTION

Figure 1:
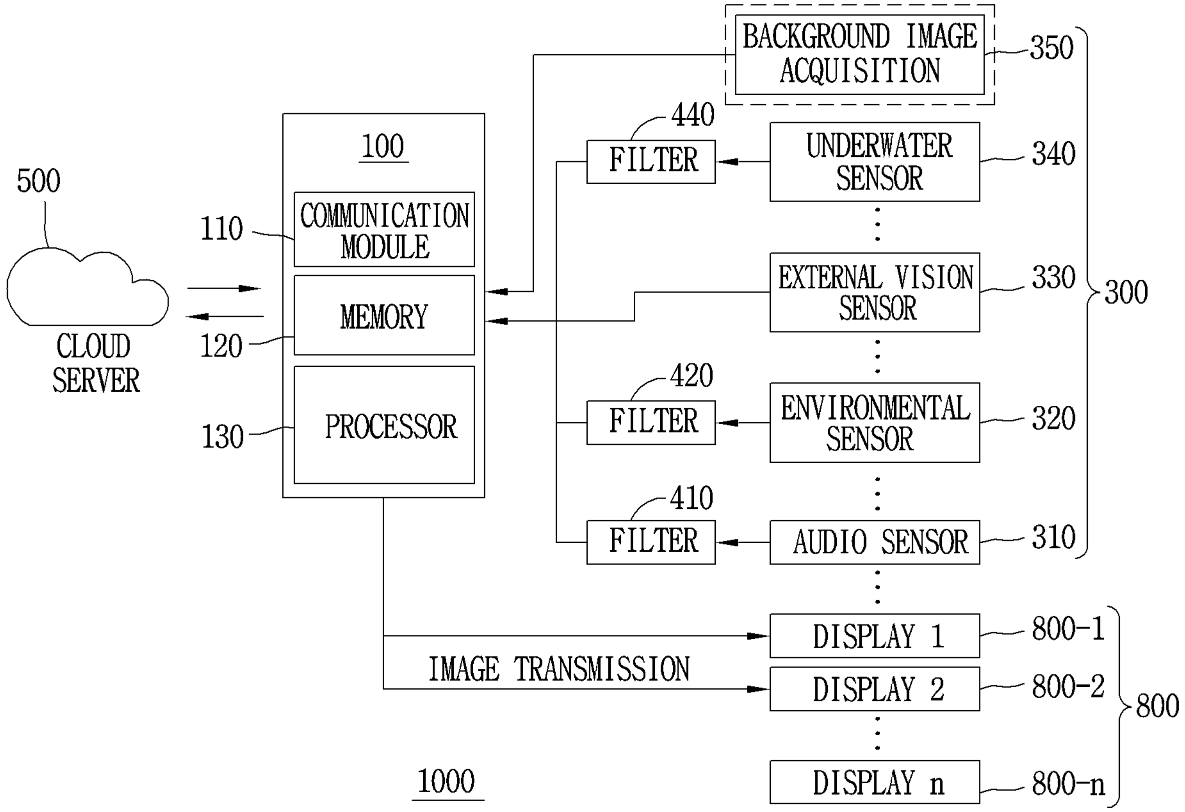
FIG. 1 is a block diagram showing an exemplary structure of a system including a realistic content provision device related to the present disclosure.

Hereinafter, embodiments of the present disclosure will be described in detail with reference to the accompanying drawings, and the same or similar elements are designated with the same numeral references regardless of the numerals in the drawings and redundant description thereof will be omitted. A suffix "module" or "unit" used for elements disclosed in the following description is merely intended for easy description of the specification, and the suffix itself does not give any special meaning or function. In describing the embodiments disclosed herein, moreover, the detailed description will be omitted when specific description for publicly known technologies to which the invention pertains is judged to obscure the gist of the present disclosure. Furthermore, the accompanying drawings are provided only for a better understanding of the embodiments disclosed herein and are not intended to limit technical concepts disclosed herein, and therefore, it should be understood that the accompanying drawings include all modifications, equivalents and substitutes within the concept and technical scope of the present disclosure.

The terms including an ordinal number such as first, second, etc. can be used to describe various elements, but the elements should not be limited by those terms. The terms are used merely for the purpose to distinguish an element from the other element.

It should be understood that when an element is referred to as being "connected to" or "coupled to" another element, the element can be connected to the other element or intervening elements may also be present. On the contrary, in a case where an element is "directly connected to" or "directly coupled to" another element, it should be understood that any other element is not present therebetween.

A singular representation may include a plural representation unless it represents a definitely different meaning from the context.

Terms "include" or "have" used herein should be understood that they are intended to indicate the presence of a feature, a number, a step, an element, a component or a combination thereof disclosed in the specification, and it may also be understood that the presence or additional possibility of one or more other features, numbers, steps, elements, components or combinations thereof are not excluded in advance.

Meanwhile, a 'swimming pool' disclosed herein is used to include various types of swimming pools such as rooftop, embedded, prefabricated, and infinite pools that can be disposed inside or outside an architectural structure such as an edifice and a building to allow playing or competition.

In addition, a 'mobile object' disclosed herein is used to include not only a moving creature such as a person (e.g., an observer, a lodger, a guest, a competition participant, etc.) and an animal, but also a robot that can move on its own within a designated space. Furthermore, herein, the mobile object may be used as a term such as an observer, a lodger, a guest, or a user, and those terms may be referred to as having the same meaning as the above-described mobile object.

Moreover, 'realistic content' disclosed herein, which is content that provides a life-like experience by maximizing a person's five senses based on ICT, provides an active interaction between a consumer and content and an experience that satisfies the five senses, and is used to include text, an image, a video, and the like that have mobility and can be output in the form of, for example, augmented reality, virtual reality, holograms, five sense media, and the like.

In addition, it is described herein that 'realistic content' is output in augmented reality, but it is apparent that the realistic content is not limited thereto. For example, 'realistic content' according to the present disclosure may be output in virtual reality (VR), mixed reality (MR), extended reality (XR), and substitutional reality (SR), and technologies related thereto may also be applied.

Furthermore, 'realistic content' disclosed herein may be used to denote interactive virtual digital content generated by recognizing and analyzing the movements, sounds, actions, and the like of surrounding objects using various sensors.

FIG. 1 is a block diagram showing an exemplary structure of a system 1000 including a realistic content provision device 100 related to the present disclosure.

Referring to FIG. 1, the system 1000 may include a realistic content provision device 100 according to the present disclosure, a plurality of sensors 300 and filters 410, 420, 440 disposed in the vicinity of a swimming pool, a cloud server 500, and one or more displays 800 disposed on an underwater surface of the swimming pool.

The cloud server 500 may communicate with the realistic content providing device 100 through one or more networks, and may provide information stored in the cloud server 500 to the realistic content providing device 100.

The cloud server 500 may store, manage, and update a plurality of realistic content items and information related thereto. In this case, the stored plurality of realistic content items may include a plurality of images corresponding to a plurality of directions for a certain object. The cloud server 500 may store, manage, and update environmental information and customer information such as weather information, time information, temperature information, and schedule information. Furthermore, the cloud server 500 may operate in conjunction with a swimming pool management service or a management service including swimming pool use.

The realistic content providing device 100 may receive sensing information from various sensors 300 disposed at various locations in the vicinity of the swimming pool, and transmit an image corresponding to the realistic content selected/generated/processed based on the received sensing information to the display 800. Here, the image transmitted to the display 800 may be a rendered image that can be output in augmented reality, or may be a 3D holographically processed image.

The realistic content providing device 100 may include a communication module 110, a memory 120, and a processor 130.

The realistic content providing device 100 may be implemented by an electronic apparatus, for example, a TV, a projector, a mobile phone, a smart phone, a desktop computer, a digital signage, a laptop, a digital broadcasting terminal, a personal digital assistant (PDA), a portable multimedia player (PMP), a navigation device, a tablet PC, a wearable device, a set-top box (STB), a DMB receiver, and the like.

The communication module 110 may include one or more modules for exchanging one or more data items with the cloud server 500. Additionally, the communication module 110 may receive sensing data from a plurality of sensors 300 disposed in the vicinity of the swimming pool. Furthermore, the communication module 110 may include one or more modules for connecting the realistic content providing device 100 to one or more networks.

The communication module 110 may perform communication with a cloud server, an artificial intelligence server, or the like using wireless Internet communication technologies such as Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like. In addition, the communication module 110 may perform communication with various sensors 300 disposed in the vicinity of a swimming pool using short-range communication technologies such as Bluetooth™, Radio Frequency Identification (RFID), Infrared Data Association (IrDA), Ultra Wideband (UWB), ZigBee, and Near Field Communication (NFC).

According to an embodiment, the communication module 110 may be configured to receive sensing information and surrounding image information from one or more sensors disposed in the vicinity of a swimming pool.

Specifically, the communication module 110 may receive image information in the vicinity of the swimming pool from a background image acquisition sensor 350 (e.g., RGB camera). Furthermore, the communication module 110 may receive various sensing information items from a plurality of sensors (e.g., a vision sensor, an environmental sensor, an audio sensor, an underwater sensor, etc.) disposed inside or outside the swimming pool.

The memory 120 stores realistic content, 3D models/data, and images related thereto. The realistic content and the 3D data related thereto stored in the memory 120 may be provided to the processor 130. Additionally, the memory 120 may store realistic content generated and/or updated by the processor 130 and the 3D models/data and images related thereto.

The memory 120 may include at least one type of storage medium, for example, a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk.

The processor 130 performs an overall operation related to the generation, selection, processing, and updating of realistic content according to the present disclosure. Furthermore, the processor 130 may perform artificial intelligence (AI)-based perception and determination based on information received from the cloud server 500 and/or the sensors 300. In addition, the processor 130 may determine a mapping area of the display 800 for outputting the generated/selected/processed/updated realistic content in augmented reality, render it to be output in augmented reality or 3D holography in the determined mapping area, and transmit related data thereto to the display 800.

The processor 130 may include sub modules for allowing an operation involving speech and natural language processing, such as an I/O processing module, an environmental condition module, a speech-to-text (STT) processing module, a natural language processing module, a workflow processing module, and a service processing module. Each of the sub modules may have an access to one or more systems or data and models or a subset or superset thereof in the realistic content providing device 100. Here, a target to which each of the sub modules has an access right may include scheduling, vocabulary index, user data, a task flow model, a service model, and an automatic speech recognition (ASR) system.

In some embodiments, the processor 130 may be configured to detect and sense what the user is requesting based on the user's intent or context conditions expressed in a user input or natural language input based on AI learning data. When an operation of the realistic content providing device 100 is determined based on a data analysis performed by AI learning, a machine learning algorithm, and a machine learning technology, the processor 130 may control the realistic content providing device 100 and external elements (e.g., sensors, a cloud server, etc. included in the system 1000) that communicate with it to execute the determined operation.

In some embodiments, the processor 130 may track the location of a mobile object in the vicinity of a swimming pool based on sensing data, and accordingly, may render a holographic object that touches the mobile object under water in the swimming pool.

The processor 130 may recognize the situation of a mobile object that has approached the swimming pool based on sensing data received through one or more sensors, and select realistic content related to the situation of the recognized mobile object. Furthermore, the processor 130 may render and transmit the selected realistic content to be output in augmented reality on a display on an underwater surface of the swimming pool.

In addition, based on sensing information received through one or more sensors, the processor 130 may process realistic content that matches surrounding image information to correspond to (a plurality of) user viewpoints that can be recognized with respect to the location of the mobile object that has approached the swimming pool. Furthermore, the processor 130 may render and transmit the processed realistic content to be output in augmented reality or as a 3D holographic image on a display on an underwater surface of the swimming pool.

In addition, when providing realistic content or a 3D holographic image using augmented reality (AR) technology, the processor 130 may render the content or images to be output as edited/processed/combined images in consideration of a plurality of observer viewpoints. Accordingly, the sense of immersion and user experience felt by the observer may be further increased.

Furthermore, the processor 130 may track the location and movement of a mobile object based on sensing data from one or more sensors 300, and render responsive realistic content or a 3D holographic image that makes eye contact and/or interacts in other ways with observers using the tracking information.

In addition, the processor 130 may perceive the observer's touch on responsive realistic content or a 3D holographic image through sensing data from one or more sensors 300 (e.g., underwater sensor 340), and generate a tactile feedback through a resultant interaction. To this end, it may be implemented such that when touching responsive realistic content or a 3D holographic image, a tactile surface is generated using, for example, an ultrasonic speaker (not shown).

In addition, the processor 130 may obtain the location, number of persons, action, and emergency situation of a mobile object (e.g., guest, etc.) on the basis of sensing information acquired from one or more sensors 300, and may interact with the guest by transmitting realistic content or a 3D holographic image corresponding to the obtained situation to the display 800.

The sensor 300 includes various sensors disposed inside and outside the swimming pool. The sensor 300 may be linked to common or separate filters 410, 420, 430 to remove noise from the acquired sensing data. In this case, the sensing data filtered through the filters 410, 420, 430 is transmitted to the processor 130 through the communication module 110.

The sensor 300 may include an audio sensor 310, an environmental sensor 320, an external vision sensor 330, and a background image acquisition sensor 350 disposed outside the swimming pool within a predetermined space. Additionally, the sensor 300 may include various underwater sensors 340 disposed under water in a swimming pool within a predetermined space.

For example, the environmental sensor 320 may include an illumination sensor, a temperature sensor, and the like.

The underwater sensor 340 may include, for example, a proximity sensor, an illumination sensor, an acceleration sensor, a magnetic sensor, a gyro sensor, a geomagnetic sensor, an inertial sensor, an RGB sensor, a motion sensor, an inclination sensor, a brightness sensor, an altitude sensor, an olfactory sensor, a temperature sensor, a depth sensor, a pressure sensor, a bending sensor, a touch sensor, an IR sensor, a fingerprint recognition sensor, an ultrasonic sensor, a light sensor, a microphone, a lidar, a radar, and the like.

The external vision sensor 330 may include one or more camera sensors. The external vision sensor 330 may monitor a mobile object in the vicinity of the swimming pool, track a movement thereof, or detect a behavioral change thereof.

The background image acquisition sensor 350 may be, for example, an RGB camera. The background image acquisition sensor 350 may be disposed in plurality on an outer wall of a structure including a swimming pool or on an outer wall of another structure adjacent thereto. The background image acquisition sensor 350 may capture an environment (e.g., other buildings, roads, etc.) in the vicinity of the swimming pool to convert the captured environment into an electrical signal.

Furthermore, the sensor 300 may include more other sensors than those shown in FIG. 1, and a plurality of the same sensors may be disposed.

The display 800 may be disposed on an underwater surface inside the swimming pool, for example, one or more of a floor surface and/or a side surface thereof under water. The display 800 may be disposed on a plurality of surfaces depending on the shape of the swimming pool, and in this case, one or more realistic content items may be output in augmented reality or as a 3D holographic image using a plurality of displays 800-1, 800-2, . . . , **800-*n***.

The display 800 may be implemented as, for example, a liquid crystal display (LCD), an organic light emitting diode (OLED), an electro luminescent display (ELD), or a micro-LED (M-LED). In some embodiments, one or more sensors capable of detecting a degree of curvature or bending of the display 800 may be included in the display 800.

In some embodiments, the display 800 may project a 3D image corresponding to realistic content to the observer's eyes using a prism. Alternatively, the display 800 may be implemented as a projector including one or more output modules (light projectors) and a camera module (camera) to generate scan data and 3D models corresponding to surrounding image information within the projector.

In some embodiments, the display 800 may be implemented in a form in which a lenticular lens is applied to a display module, for example, M-LED or OLED.

A lenticular lens is a special lens that has several semi-cylindrical lenses connected side by side. In a lenticular lens, each convex structure may act as a lens, so the information of the pixels of the display 800 located behind the lens may move in different directions, and using this, slightly different images may be formed depending on the location of the observer's viewpoint.

In some embodiments, the display 800 may be implemented as a light field (LF) display. When the light field display is used, the observer does not need to wear any other external device or be located in a specific location to observe 3D realistic content or a holographic image.

When implemented as a light field (LF) display, the display 800 may have a light field display module disposed on a floor surface and/or a side surface (either one or both surfaces) under water in the swimming pool. Furthermore, the display 800 may be configured as a light field display assembly including one or more light field display modules. Additionally, each light field display module may have a display area, and may be tiled to have an effective display area that is larger than that of the individual light field display modules.

In addition, it may be implemented such that the light field display module provides realistic content or a 3D holographic image to one or more mobile objects located within a viewing volume formed by the light field display module disposed on an underwater surface of the swimming pool according to the present disclosure.

Figure 2:
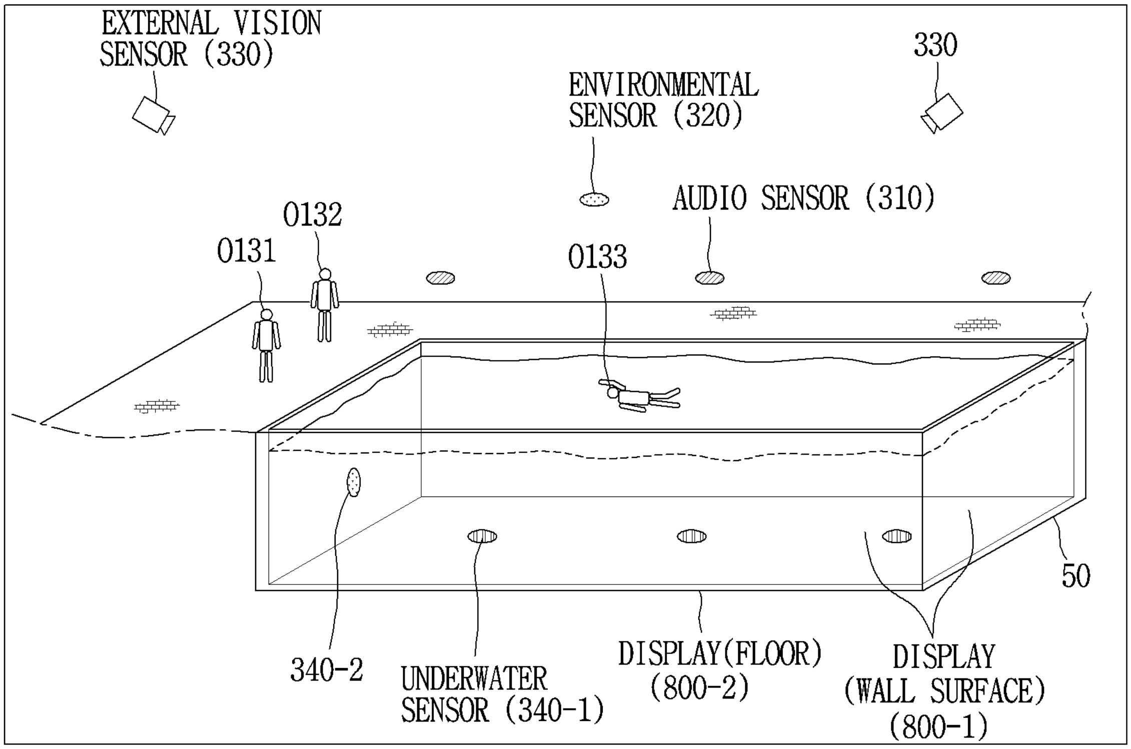
FIG. 2 is an exemplary conceptual diagram in which the detailed configuration of the system of FIG. 1 is applied to a swimming pool.

FIG. 2 is an exemplary conceptual diagram in which the detailed configuration of the system of FIG. 1 is applied to a swimming pool.

Referring to FIG. 2, the illustrated swimming pool 50 may be disposed on a rooftop of a structure (e.g., building), and is shown as having a square shape, but is not limited thereto.

The sensor disposed outside the swimming pool 50 may include, for example, an audio sensor 310, an environmental sensor 320, an external vision sensor 330, and the like Furthermore, sensors disposed inside the swimming pool 50 may include an underwater sensor 340-1, 340-2 including at least one of a temperature sensor, an acceleration sensor, an ultrasonic sensor, and a water pressure sensor.

One or more mobile objects 0131, 0132, 0133, for example, observers (hereinafter referred to as 'observers' for convenience of explanation), may be located in the vicinity of the swimming pool 50, and those objects may be located at different locations in the vicinity inside (i.e. underwater) or outside the swimming pool 50.

A plurality of displays 800-1, 800-2 may be disposed on an underwater surface of the swimming pool 50. The display 800-1, 800-2 may be implemented as a light field (LF) display or may be implemented as a display module such as OLEDs with a lenticular lens applied thereto.

Responsive realistic content or a 3D holographic image related to the observer's situation is output in augmented reality through the plurality of displays 800-1, 800-2. Specifically, responsive realistic content or a 3D holographic image related to the observer's situation is output in augmented reality within a viewing volume where the content or image is output through the plurality of displays 800-1, 800-2 can be observed.

When one realistic content item or 3D holographic image is output on all of the plurality of displays 800-1, 800-2, it may be implemented such that the image may be provided seamlessly between the displays disposed on different surfaces.

The realistic content or 3D holographic image displayed on at least one of the plurality of displays 800-1, 800-2 may be, for example, in full color, and may be displayed not only in front of but also behind the display. The realistic content or 3D holographic image may be provided so as to be recognized at any location within the viewing volume (e.g., under water in the swimming pool 50), and may be output in 3D so as to appear to the observer 0131, 0132, 0133 as if the realistic content or 3D holographic image is floating in the water, and has a volume.

The external vision sensor 330 may sense observers 0131, 0132, 0133 that have approached the swimming pool 50, and monitor and track their locations, movements, and behaviors. For example, the external vision sensor 330, for example, an RGB camera, may collect sensing data for obtaining the identification information (to this end, it can be linked with the cloud server 500), location, number of persons, behavior, emergency situation of the observer 0131, 0132, 0133 in real time.

The audio sensor 310 may detect whether the recognized observer 0131, 0132, 0133 is in an emergency situation, for example, whether there is a request for rescue.

The environmental sensor 320 may sense an environment in the vicinity of the swimming pool 50. The environmental sensor 320 may include, for example, an illumination sensor, a temperature sensor, a radiation sensor, a heat sensor, a gas sensor, and the like.

The underwater sensor 340-1, 340-2 may detect the observer's movement, moving speed, behavior, gesture, touch, and the like. To this end, the underwater sensor 340-1, 340-2 may include, for example, at least one of a proximity sensor, an illumination sensor, an acceleration sensor, a magnetic sensor, a gyro sensor, a geomagnetic sensor, an inertial sensor, an RGB sensor, a motion sensor, an inclination sensor, a brightness sensor, an altitude sensor, an olfactory sensor, a temperature sensor, a depth sensor, a pressure sensor, a bending sensor, a touch sensor, an IR sensor, a fingerprint recognition sensor, an ultrasonic sensor, a light sensor, a microphone, a lidar, and a radar, or a combination thereof.

On the basis of the observer's movement tracked through the underwater sensor 340-1, 340-2, the mapping location of the realistic content or 3D holographic image being output to the plurality of displays 800-1, 800-2 is varied. This is to provide the realistic content or 3D holographic image being output according to the changed viewpoint and eye level of the observer. Accordingly, the sense of immersion and user experience felt by the observer is further increased.

In addition, on the basis of the observer's movement tracked through the underwater sensor 340-1, 340-2, the realistic content or 3D holographic image being output to the plurality of displays 800-1, 800-2 may be interactively varied. For example, the realistic content or 3D holographic image that is output on the plurality of displays 800-1, 800-2 may be generated as responsive realistic content or a 3D holographic image that makes eye contact and/or interacts in other ways with the observers 0131, 0132, 0133.

Figure 3:
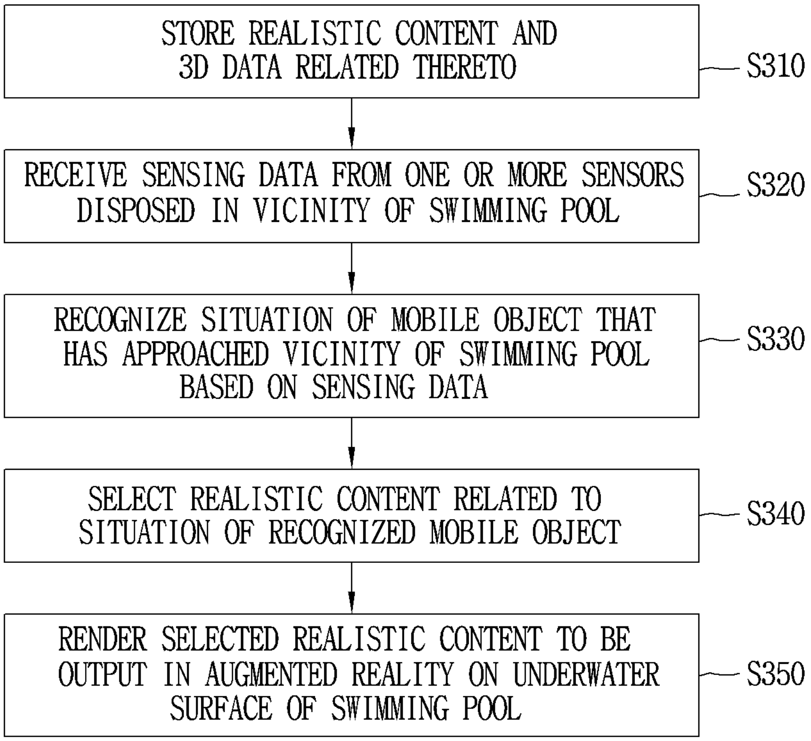
FIG. 3 is a flowchart of a realistic content provision method related to the situation of a mobile object related to the present disclosure.

FIG. 3 is a flowchart of a realistic content provision method related to the situation of a mobile object related to the present disclosure. Unless otherwise specified, each step/process shown in FIG. 3 is performed by the processor of the realistic content providing device 100 or a separate stand-alone processor.

Referring to FIG. 3, a method of providing realistic content according to the present disclosure begins with a step S310 of storing realistic content and 3D data related thereto in a storage such as a memory. In this case, realistic content and 3D data related thereto stored in a storage such as a memory may be generated on the basis of sensing information acquired through one or more sensors 300. In addition, realistic content and 3D data related thereto stored in a storage such as a memory may include a plurality of images corresponding to a plurality of directions for a certain object. In some embodiments, the storing step S310 may be omitted or may be performed subsequent to another step.

The realistic content providing device 100 may receive sensing data from one or more sensors disposed in the vicinity of the swimming pool through a communication module (S320). Here, sensing data refers to data collected in real time by at least one of a vision sensor, an environmental sensor, an audio sensor, an underwater sensor, and the like, which are disposed outside the swimming pool, and one or more underwater sensors disposed inside the swimming pool.

The processor may recognize the situation of a mobile object that has approached the vicinity of the swimming pool based on the received sensing data (S330).

Here, the situation of the mobile object may be information related to one or more of a type of the mobile object recognized as having approached the vicinity of the swimming pool, whether there are a plurality thereof, a location, an action and/or a behavioral change, and whether personal information is linked thereto.

Here, the type of the mobile object denotes whether the mobile object, that is, the observer, is a human, an animal, or a mobile robot. Furthermore, whether there are a plurality of mobile objects denotes whether the number of detectable mobile objects in a space is single or in plurality.

Additionally, the location of the mobile object may include a relative location of the mobile object, whether the mobile object is outside or under water in the swimming pool, and a viewpoint/line-of-sight of the mobile object obtained based on a head direction of the mobile object.

In addition, the behavioral change of the mobile object may include a movement, a moving speed, a specific operation, and a behavior determined to be an emergency situation of the mobile object.

Furthermore, whether the personal information of the mobile object is linked denotes whether one or more identification information of the mobile object has been sensed/received by detecting an apparatus (e.g., a terminal device, an access watch, an access card, etc.) carried by the mobile object.

Subsequently, the processor may select realistic content related to the situation of the recognized mobile object from the memory (S340).

The realistic content related to the situation of the mobile object denotes customized, responsive realistic content based on the perception or determination of a location of the mobile object (e.g., a user viewpoint based on a location), an action thereof (e.g., whether he or she is moving, a moving speed, etc.), and whether he or she is in an emergency situation.

Alternatively, the processor may receive realistic content related to the situation of the recognized mobile object from the cloud server 500 or generate it on its own based on the sensed information. Alternatively, according to an embodiment, the processor may combine information collected from the cloud server 500 (e.g., weather information, time information, etc.) with the situation of the mobile object to select related realistic content from the memory.

Subsequently, the processor may render the selected/received/generated realistic content to be output in augmented reality on the underwater surface of the swimming pool (S350).

Specifically, the processor may render data related to realistic content and transmit it to a display disposed under water in the swimming pool to provide content suitable for VR/AR/MR services to the user.

According to an embodiment, the rendering process S350 may include recognizing an approach location of a mobile object based on the received sensing data, and rendering and transmitting responsive realistic content to be output in augmented reality or as a 3D holographic image in a display area determined on the basis of the approach location of the mobile object.

According to an embodiment, when there are a plurality of mobile objects that have approached, the processor may render individual responsive realistic content items associated with the respective mobile objects to be output in augmented reality in a display area determined on the basis of the respective locations of the plurality of mobile objects.

Furthermore, according to an embodiment, the processor may track the location, movement, and action of a mobile object in the vicinity of the swimming pool on the basis of sensing data, and accordingly render a holographic object that touches the mobile object (e.g., observer) located under water in the swimming pool and transmit it to the display in order to provide more interactive, responsive realistic content (or a 3D holographic image).

Meanwhile, the realistic content providing device according to the present disclosure may perceive an interaction condition according to a location of an observer in the vicinity of the swimming pool, a number of observers, and an action based on sensing data, and provide responsive realistic content (or a 3D holographic image) in a variable manner.

Figure 4A:
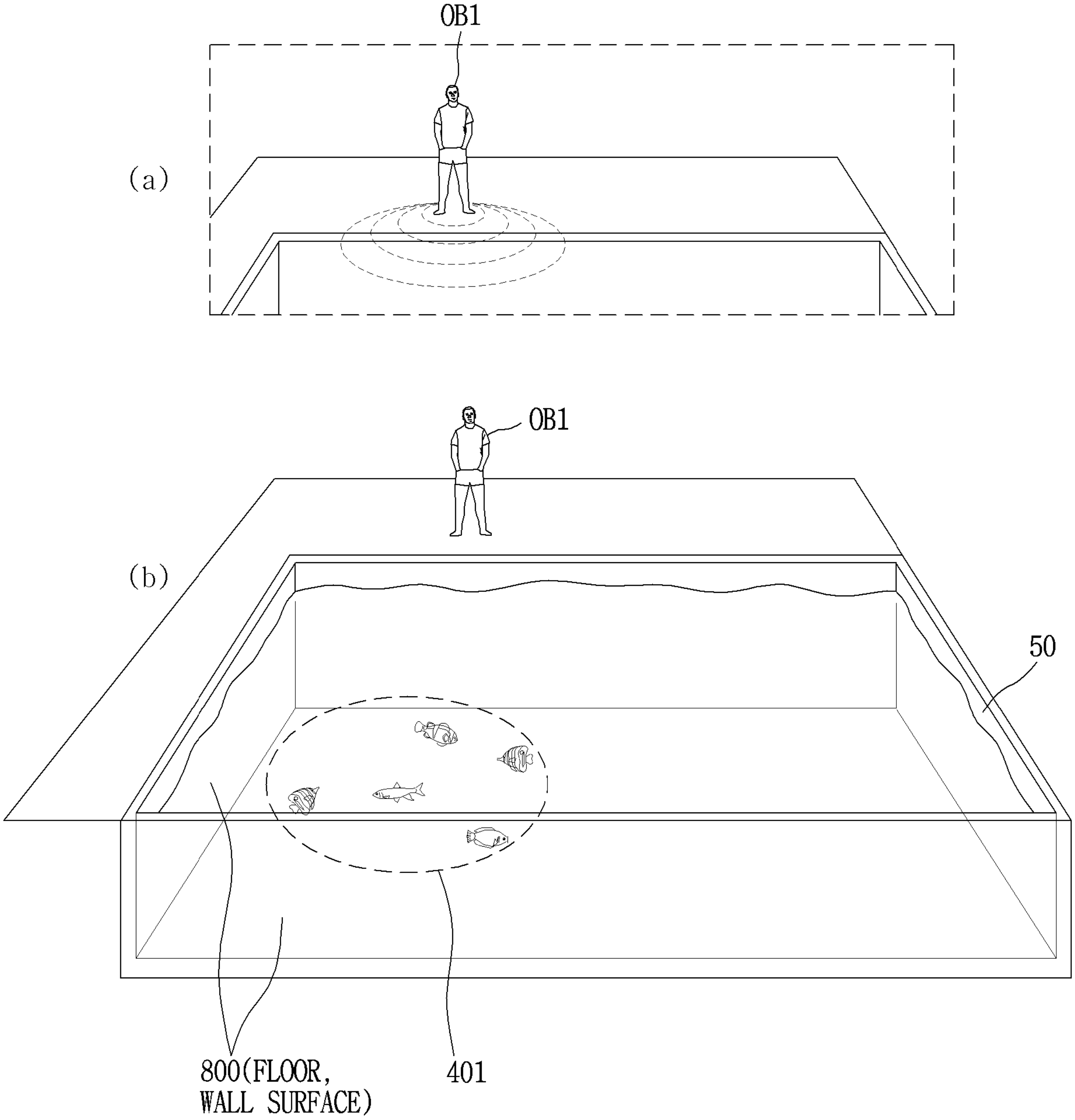
FIGS. 4A, 4B, and 4C are conceptual diagrams for explaining realistic content that varies widely depending on the number and behavioral characteristics of mobile objects related to the present disclosure.
Figure 4B:
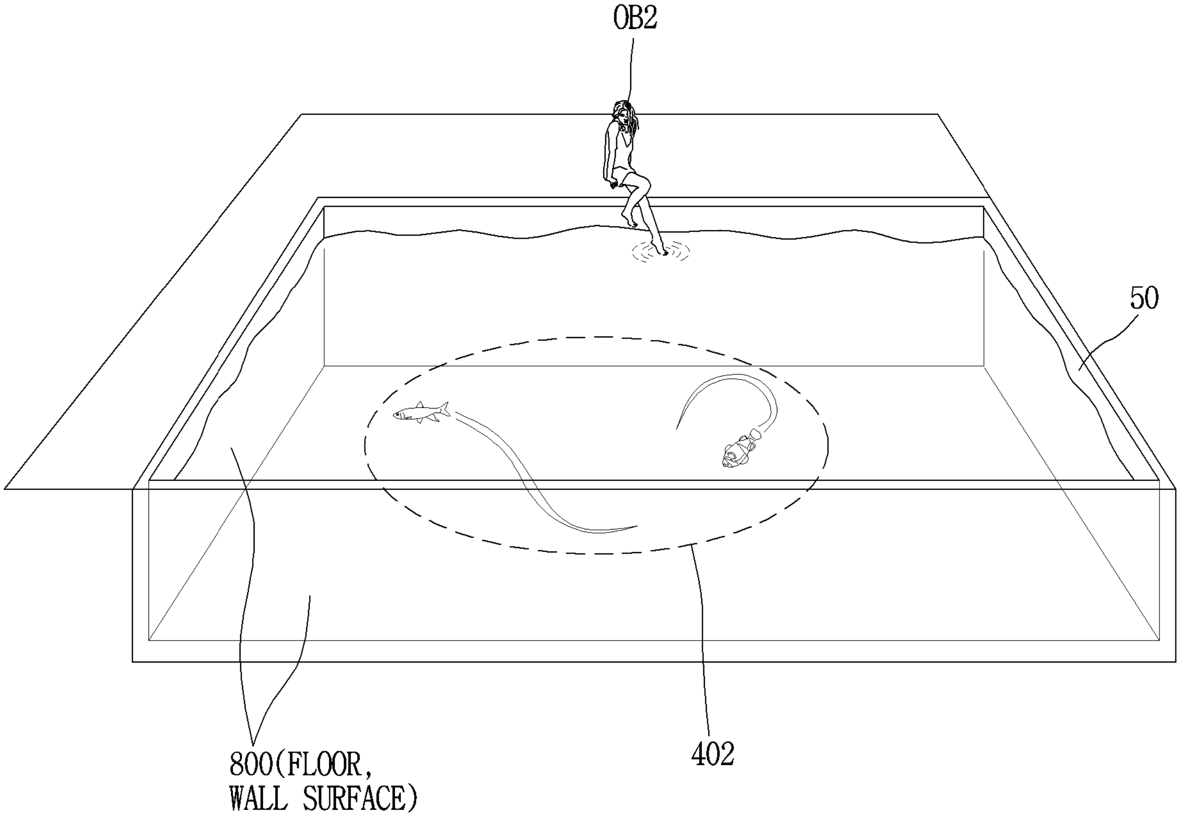
Figure 4C:
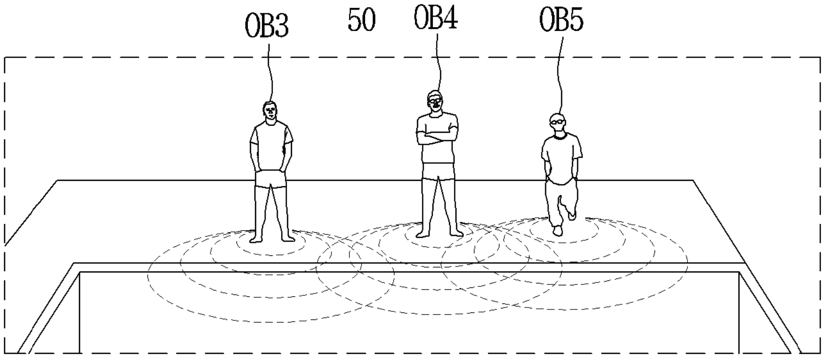
Figure 4C:
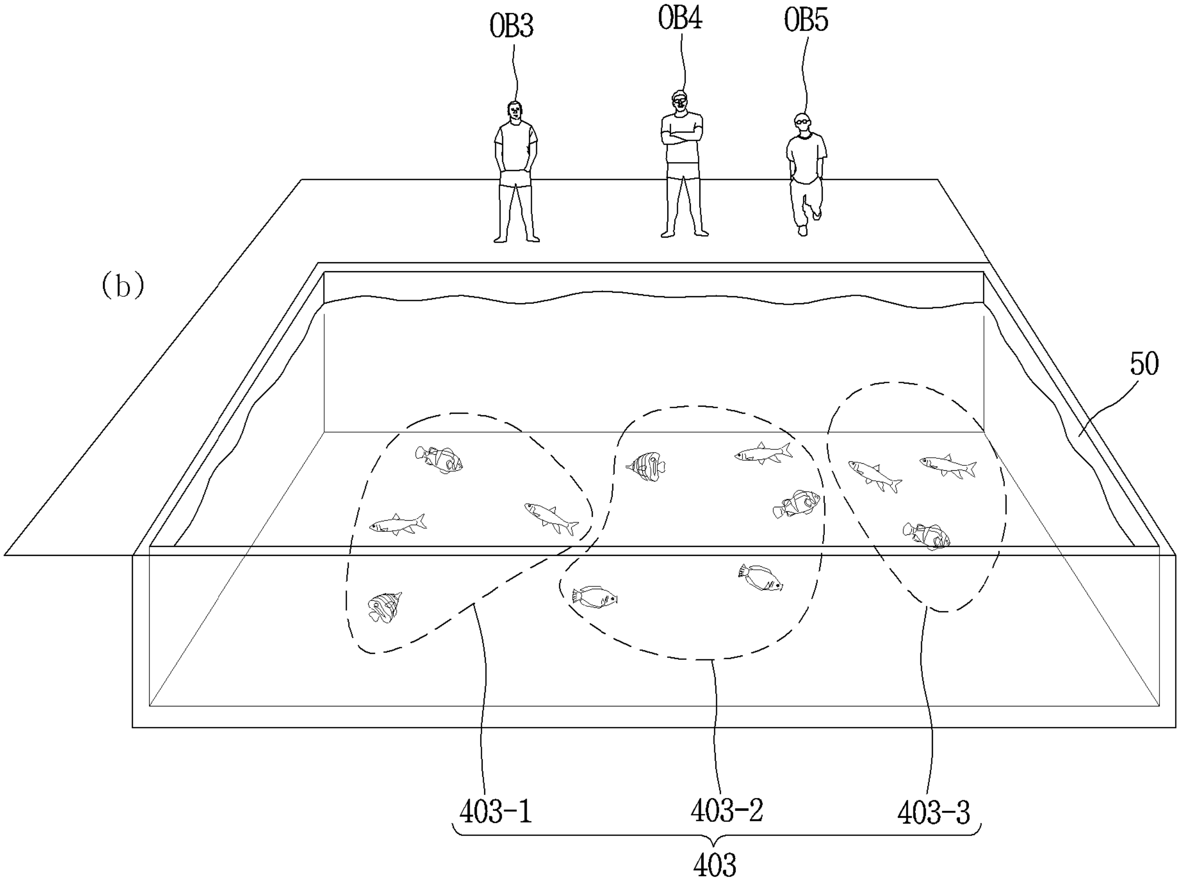

FIGS. 4A, 4B, and 4C are examples of providing realistic content that varies widely depending on the number and behavioral characteristics of mobile objects related to the present disclosure.

First, with reference to FIGS. 4A and 4C, how to provide responsive realistic content (or a 3D holographic image) in a variable manner according to the number of observers will be described.

The processor of the realistic content providing device according to the present disclosure may recognize an approach location of a mobile object based on sensing data acquired in the vicinity of the swimming pool, and render responsive realistic content to be output in augmented reality or as a 3D holographic image in a display area determined on the basis of the approach location of the mobile object.

Referring to FIG. 4A, when an observer OB1 approaches the vicinity of the swimming pool 50, the realistic content providing device according to the present disclosure may sense the approaching of the observer OB1 through one or more sensors (e.g., an external vision sensor, an underwater sensor), and track the location of the observer OB1.

The processor selects/generates responsive realistic content based on the location of the observer OB1, renders it in augmented reality, and transmits the rendered content to the display 800 on the underwater surface (e.g., a floor surface, a side surface) of the swimming pool.

Accordingly, on the display 800 of the underwater surface (e.g., a floor surface, a side surface) of the swimming pool, responsive realistic content 401 (e.g., a fish object approaching the location of the observer OB1) is output in a display area determined based on the location of the observer OB1.

At this time, the responsive realistic content 401 may move according to the location of the observer OB1, which is tracked in real time based on sensing data, and the rendering and transmission location may be varied to correspond to a moving speed of the observer OB1.

In addition, when the observer OB1 disappears from the vicinity of the swimming pool (e.g., moves to another place) on the basis of the sensing data, and the situation is detected on the basis of the sensing data, the responsive realistic content 401 may no longer be output or may be interacted with by being scattered throughout the viewing volume of the swimming pool 50.

According to an embodiment, when there are a plurality of mobile objects that have approached the vicinity of the swimming pool, the processor may render individual responsive realistic content items associated with respective mobile objects to be output in augmented reality based on respective locations of the plurality of mobile objects.

Referring to FIG. 4C, when a plurality of observers OB3, OB4, OB5 approaches the vicinity of the swimming pool 50 as shown in (a) of FIG. 4C, the realistic content providing device according to the present disclosure may sense the approaching of the observer OB3, OB4, OB5 through one or more sensors (e.g., an external vision sensor, an underwater sensor), and track the respective locations of the observers OB3, OB4, OB5.

As shown in (b) of FIG. 4C, the processor may select/generate individual responsive realistic content items 403-1, 403-2, 403-3, which are centered on the respective locations of the observers OB3, OB4, OB5, and render the content in augmented reality, and transmit the rendered content to the display 800 on the underwater surface (e.g., a floor surface, a side surface) of the swimming pool.

Here, the individual responsive realistic content items 403 may be different types of realistic content items. For example, in (c) of FIG. 4C, although all individual responsive realistic content items 403 are shown as the same type, different types of individual responsive realistic content items may be selected and transmitted depending on the respective situations of the observers OB3, OB4, OB5.

On the display 800 of the underwater surface (e.g., a floor surface, a side surface) of the swimming pool, the processor may control the responsive realistic content items 403 (e.g., fish objects approaching the respective locations of the observers OB3, OB4, OB5) to be output in a display area determined on the basis of the respective locations of the observers OB3, OB4, OB5.

Meanwhile, according to an embodiment, a number of recognizable observers may be limited on the basis of sensing data. For example, when the number of recognizable observers is limited to 10 on the basis of the sensing data, individual responsive realistic content items which are centered on respective locations may be provided for up to 10 observers, but when the number exceeds 10, responsive realistic content may be provided only to selected observers based on established criteria.

Next, with reference to FIG. 4B, how to provide responsive realistic content (or a 3D holographic image) in a variable manner according to the behavior of an observer will be described.

The realistic content providing device according to the present disclosure, based on sensing data, may collect the situation of a mobile object that has approached the swimming pool, for example, situation information related to one or more of a type of the mobile object, a number of mobile objects, a location, a behavioral change, and whether personal information is linked thereto.

Furthermore, the processor of the realistic content providing device may select related realistic content based on information collected from the cloud server and the collection situation of the mobile object. Here, the information collected from the cloud server may include identification information on the observer (e.g., the observer's name, date of birth, interests, etc.).

The processor may monitor changes a behavioral change of a mobile object based on sensing data, and change realistic content that is output in real time on the basis of the monitoring result.

Furthermore, when outputting responsive realistic content in response to a behavioral change of a mobile object, the processor may vary the responsive realistic content based on information collected from the cloud server.

Referring to FIG. 4B, the behavior of the observer OB2 recognized through the sensor 300 in the vicinity of the swimming pool may be monitored in real time through the sensor 300. For example, the behavior of the observer OB2 stepping into or entering the water of the swimming pool may be collected as information on the situation of the mobile object through the external vision sensor 330 or the underwater sensor 340.

The processor may control an interaction response to realistic content or a 3D holographic image to be output through the display 800 on the underwater surface of the swimming pool, based on the collected behavior of the observer OB2.

For example, based on the perception that the observer OB2 has made a motion of stepping into the water of the swimming pool, a ripple/wave effect (e.g., a movement such as scattering of the object) may be applied to realistic content or a 3D holographic image 402 (e.g., a fish object) projected around the location of the observer OB2. The ripple/wave effect may vary depending on a viewing volume, which is influenced by the collected behavior of the observer OB2.

The processor 130 may provide responsive realistic content for each of a plurality of observers based on sensing data, for example, sensing data acquired from the external vision sensor 330, the underwater sensor 340 (e.g., an acceleration sensor, an ultrasonic sensor, a water pressure sensor, etc.).

For example, depending on whether an observer located in the swimming pool 50 is swimming (e.g., content of swimming with a famous swimmer), whether a tube is used (e.g., content of Jaws approaching a tube), whether he or she is diving (e.g., content of a famous diving spot), or whether he or she is going underwater (e.g., content of a famous diving spot), responsive realistic content corresponding thereto may be output through the display 800.

Although not shown, when rendering realistic content related to the situation of the recognized mobile object at a certain location on a first display located at a side surface of the swimming pool and a second display located at a floor surface thereof, the processor may render the certain location in a variable manner according to a behavioral change of the recognized mobile object.

For example, when an observer in the swimming pool 50 is swimming, realistic content or a 3D holographic image projected based on the observer's location may be rendered with a variable location to move in response to the observer's swimming speed. In addition, an object (e.g., dolphin object) corresponding to the projected realistic content or 3D holographic image may be touched by the observer, or vice versa, it may be implemented such that the observer can feel a tactile surface along with a visual experience using the underwater sensor 340 (e.g., an acoustic speaker sensor), for example.

Furthermore, the processor may control realistic content suitable for a current water temperature to be output based on sensing data acquired through the underwater sensor 340, for example, a temperature sensor. Specifically, the processor may transmit environmental realistic content that allows to feel different water temperatures depending on whether a water temperature value acquired by the temperature sensor among the underwater sensors exceeds a reference value.

For example, when the water temperature value acquired by the temperature sensor is below 25 degrees Celsius, realistic content (e.g., content about polar bears roaming around at the North Pole) that allows to experience the feeling of cold water temperatures may be transmitted. Additionally, when the water temperature value acquired by the temperature sensor is above 29 degrees Celsius, realistic content (e.g., content about snorkeling in a warm resort) that allows to experience the feeling of warm water temperatures may be transmitted.

Figure 5A:
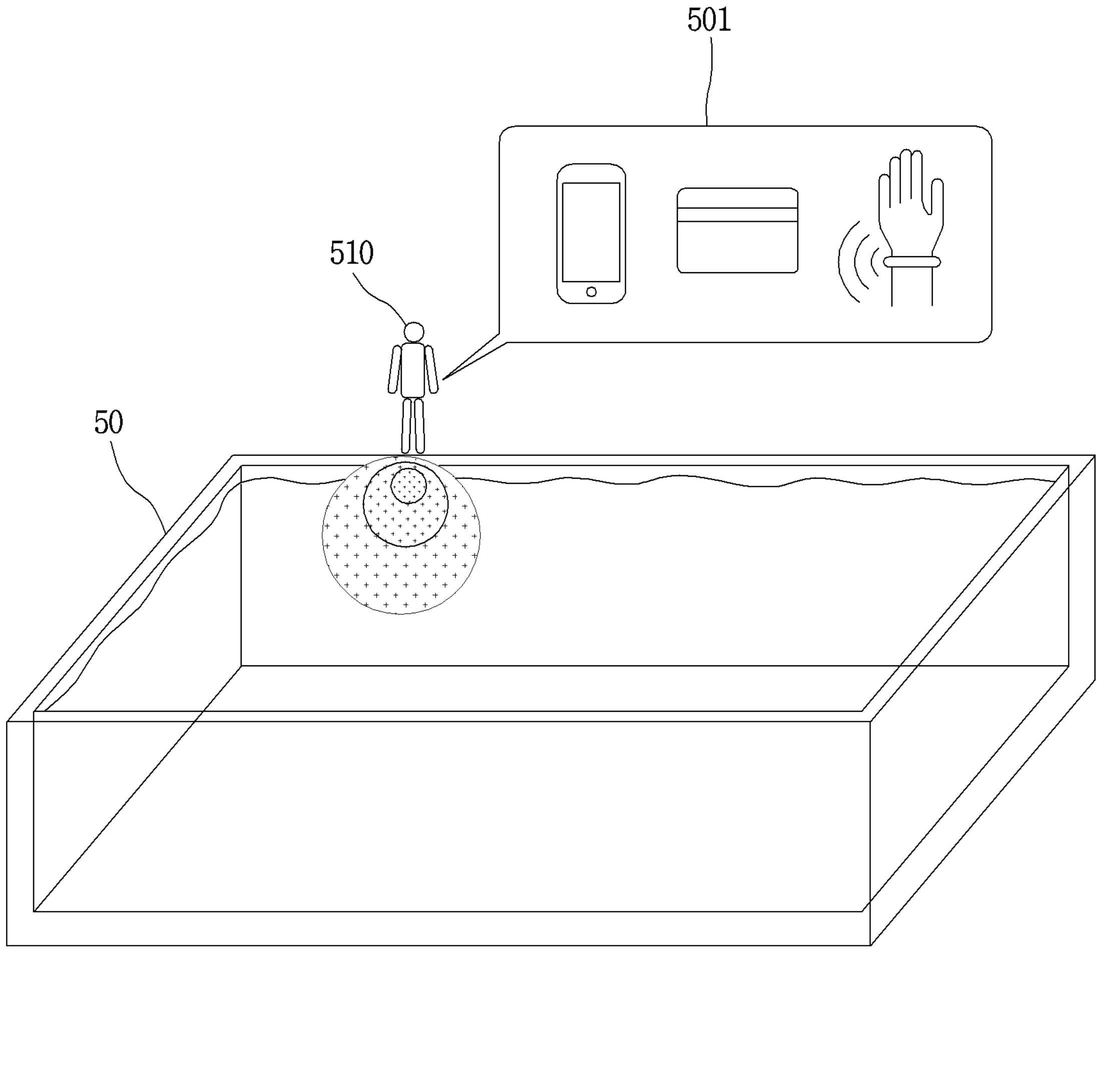
FIGS. 5A and 5B are conceptual diagrams for explaining realistic content that changes in linkage with personal information of a mobile object related to the present disclosure.

Next, with reference to FIGS. 5A and 5B, how to provide realistic content in a variable manner in linkage with personal information of a mobile object in the vicinity of the swimming pool will be described The processor of the realistic content providing device 100 according to the present disclosure may acquire an observer's personal information in linkage with a sensor worn by a mobile object, for example, a personal apparatus, on the basis of recognizing the approach of the mobile object based on sensing data received through one or more sensors in the vicinity of the swimming pool.

In this case, the processor may receive linked personal information from the cloud server 500, for example. The processor may vary realistic content based on linked personal information (e.g., name, date of birth, anniversary, interests, etc.) and transmit it to the underwater display of the swimming pool.

The personal apparatus may be, for example, any one of a user terminal (e.g., a mobile phone, a smart watch, etc.), a card, a tag key, and an access bracelet.

The processor, in linkage with the personal apparatus, may access registered accessible personal information to identify the observer 510.

In this manner, when the observer 510 is identified through the accessed personal information, upon selecting/processing/generating realistic content based on sensing data, the processor may perform the selection/processing/generation of the realistic content by combining the linked personal information.

Figure 5B:
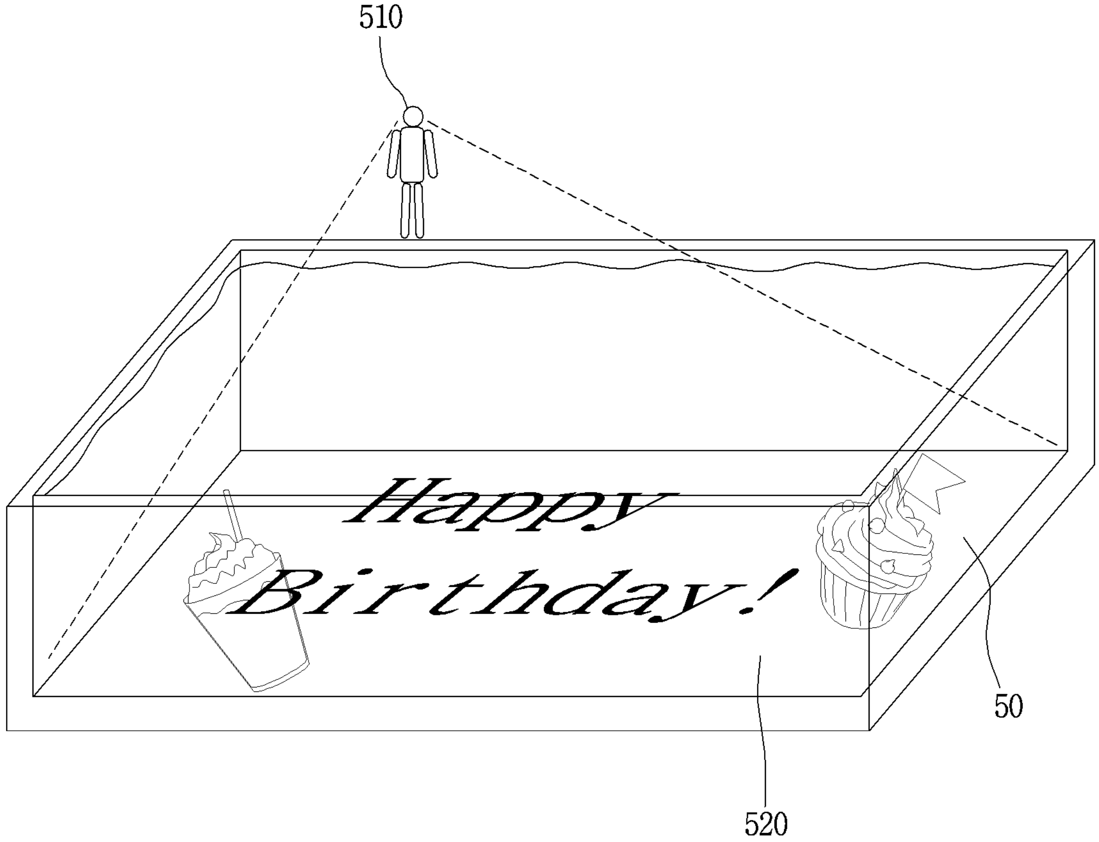

For example, as shown in FIG. 5B, based on the perception that today is the anniversary (e.g., birthday) of the observer 510 through the accessed personal information, a happy birthday message 520 or the like may be output to a display on the underwater surface in the form of realistic content or a 3D holographic image. Alternatively, although not shown, realistic content or a 3D holographic image may be output based on the interest information of the observer 510 (e.g., update information on a favorite celebrity of the observer 510, etc.).

Meanwhile, in some embodiments, realistic content or a 3D holographic image generated based on the personal information of the observer 510 may be implemented to be incident only on the eyes of the observer 510 to protect privacy.

To this end, the processor 130 may combine one or more external vision sensors 330 with underwater sensors 340 to more accurately perceive a viewpoint of the observer 510, and calculate a mapping location of personal information-based realistic content or 3D holographic image, and control the image that is output to the calculated mapping location to be shown only from the viewpoint of the observer 510.

Next, with reference to FIG. 6, how to provide realistic content in a variable manner based on information collected from a cloud server related to the present disclosure will be described.

Figure 6:
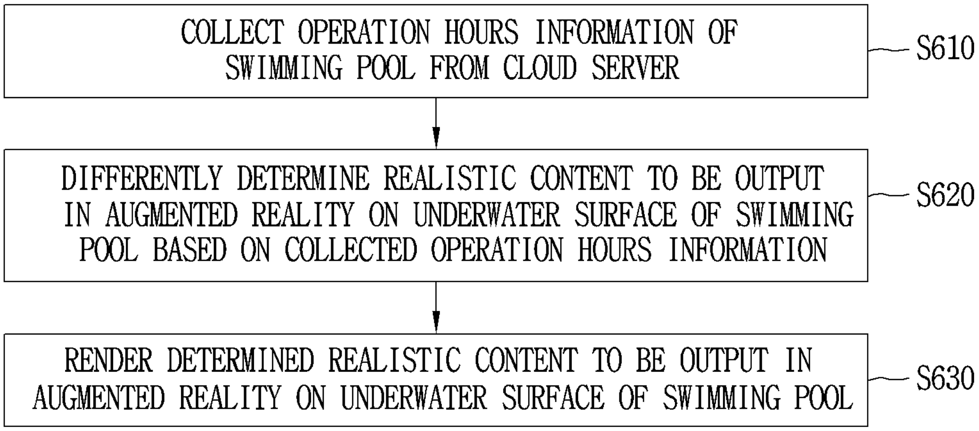
FIG. 6 is a flowchart showing a method of providing realistic content that varies based on information collected from a cloud server related to the present disclosure.

Referring to FIG. 6, the realistic content providing device 100 according to the present disclosure may communicate with a cloud server through a communication module to collect the operation hours information of a swimming pool from a cloud server (S610).

The operation hours information may include operation start and end hours by period (peak season, off-peak season, etc.) and day of the week, and may also include information on non-working days. The operation hours information may be updated periodically in linkage with a swimming pool management service or manager.

The processor of the realistic content providing device 100 may differently determine realistic content to be output in augmented reality on the underwater surface of the swimming pool based on the collected operation hours information (S620).

For example, the processor may select and render personalized responsive realistic content during swimming pool operation hours based on collected operation hours information. Furthermore, the processor may select realistic content including various information items (e.g., advertisements for lodging hotels in the swimming pool, advertisements for stores in the area, etc.) and marketing information in consideration of remote observers during non-operation hours of the swimming pool.

Subsequently, the processor may render the determined realistic content to be output in augmented reality on the underwater surface of the swimming pool (S630).

In this manner, customized realistic content may be provided according to whether the swimming pool is in operation based on the collected hours information, thereby providing responsive realistic content during operation hours and utilizing it as marketing and information provision purposes during non-operation hours.

In addition, although not shown, the processor may combine time and weather information collected from the cloud server with sensing data acquired by an environmental sensor in the vicinity of the swimming pool, for example, an illuminance sensor, to transmit realistic content or a 3D holographic image having an illuminance appropriate for the current time and weather.

Subsequently, with reference to FIG. 7 below, how to quickly determine an emergency situation in a swimming pool based on sensing information and provide linked realistic content to quickly notify the emergency situation will be described.

The processor of the realistic content providing device according to the present disclosure may perceive a dangerous situation of a mobile object based on sensing data received from one or more sensors disposed in the vicinity of the swimming pool.

Figure 7:
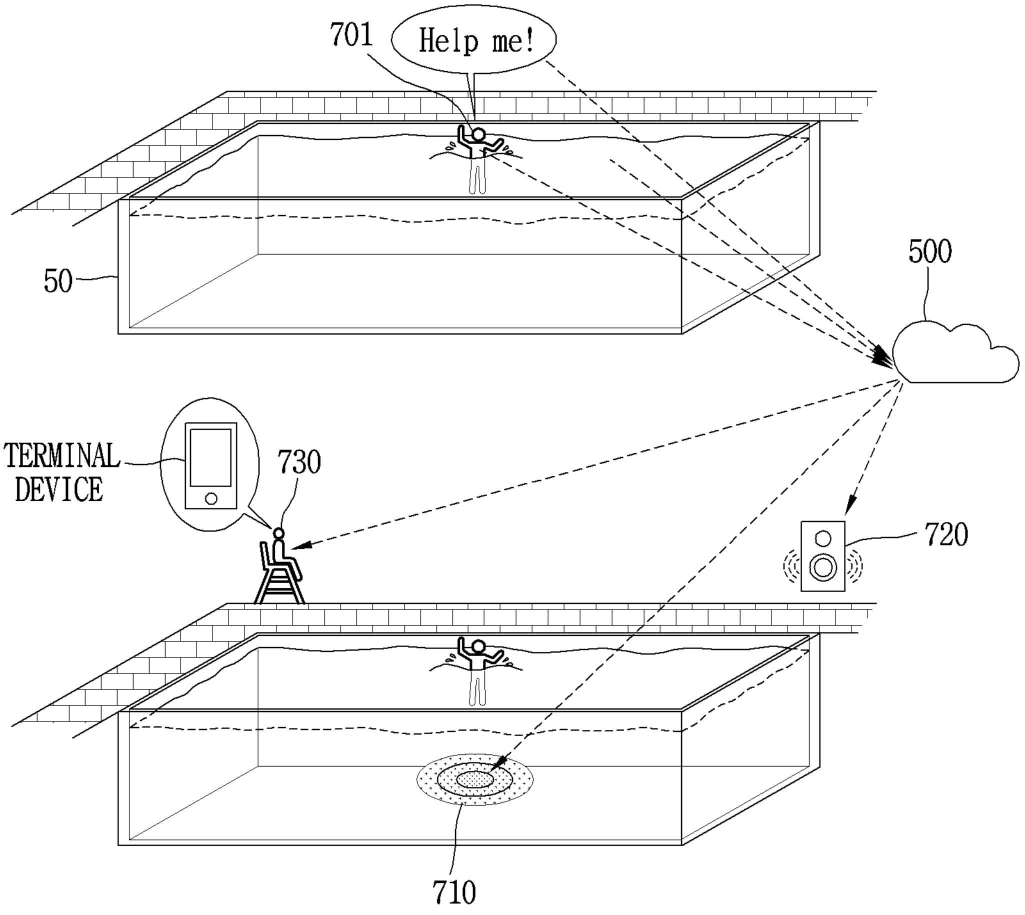
FIG. 7 is a conceptual diagram for explaining how to provide realistic content linked when determining an emergency situation based on sensing information related to the present disclosure.

For example, as shown in FIG. 7, when a guest 701 who has entered the swimming pool utters a voice indicating an emergency situation, and there are no safety management personnel or other guests nearby (or if the music is turned on loudly), it may be difficult to quickly perceive an emergency situation.

Accordingly, the realistic content providing device according to the present disclosure may recognize the utterance of the guest 701 through the audio sensor 310 disposed in the vicinity of the swimming pool, and monitor the behavior (e.g., floundering) of the guest 701 through the external vision sensor 330 to perceive that an emergency situation has occurred. At this time, the processor of the realistic content providing device may continuously learn utterances and behaviors in various emergency situations through an AI model (e.g., various keywords notifying emergency situations (e.g., 'help, help me, save me, etc.') to accurately determine whether an emergency situation has occurred.

In this manner, when it is determined that an emergency situation has occurred, the processor of the realistic content providing device may transmit an event signal according to the emergency situation to the cloud server 500, and the cloud server 500 may be implemented to transmit it with a sound as a message notifying an emergency situation to the terminal 730 of the swimming pool manager/safety officer.

Furthermore, based on the sensing data, the processor may perceive a location where an emergency situation has occurred, for example, the location of the guest 701 under water, and transmit realistic content or a 3D holographic image, including an object that can identify the corresponding point on the underwater floor display.

The processor may render notification content to be displayed at a location related to the perceived dangerous situation.

As an example, the processor may transmit image data to allow a ripple/waveform object to be output on a floor surface perpendicular to the location of the guest 701, as shown in FIG. 7. At this time, the output ripple/waveform object may be output in a striking color (e.g., a red color that is distinguishable from the blue water of the swimming pool) that allows the user to visually perceive a dangerous situation. Alternatively, although not shown, an object guiding the location of the guest 701, for example, an arrow object, may be output on the floor surface perpendicular to the location of the guest 701.

In this manner, realistic content or a 3D holographic image including an object that indicates the location of an emergency situation may be output under water in the swimming pool, thereby intuitively identifying and quickly rescuing a guest in danger.

Furthermore, the processor may transmit a notification corresponding to the dangerous situation through a communication module or a cloud server while the notification content is displayed at a location related to the perceived dangerous situation, and may control an audio output device 720 in the vicinity of the swimming pool to output a sound corresponding to the notification. Accordingly, anyone in the swimming pool may recognize the occurrence of a dangerous situation through the sound output through the audio output device 720 to notify the manager/safety personnel of the emergency situation.

In addition, the realistic content providing device according to an embodiment of the present disclosure may generate more diverse and personalized realistic content or a 3D holographic image by combining various situations of mobile objects described above.

Meanwhile, herein, the swimming pool may be disposed on a rooftop of a structure. In this case, by providing realistic content that is connected to a surrounding background, a new experience may be provided to a guest or the like, such as making the floor of the rooftop swimming pool feel as if it is floating in the air. Through this implementation, the same experience may be provided without actually designing the structure to view the scenery below through the floor of the rooftop swimming pool.

To this end, in the following embodiments, realistic content is provided based on background image information acquired by the background image acquisition sensor 350 shown in FIG. 1.

The background image acquisition sensor 350 may include a plurality of RGB cameras, and the processor may collect background images from various angles with respect to structures in the vicinity the swimming pool in real time therethrough.

Meanwhile, the observer may be located at various points in the vicinity of the swimming pool, and in this case, the observation point is different for each location, and thus realistic content must be provided in consideration of various viewpoints so as to avoid a sense of difference from the background of reality.

Accordingly, in the following embodiments, a method of providing realistic content in consideration of various viewpoints of an observer when providing an image connected to the background/landscape of a structure, including a swimming pool, as realistic content will be described in detail.

Figure 8:
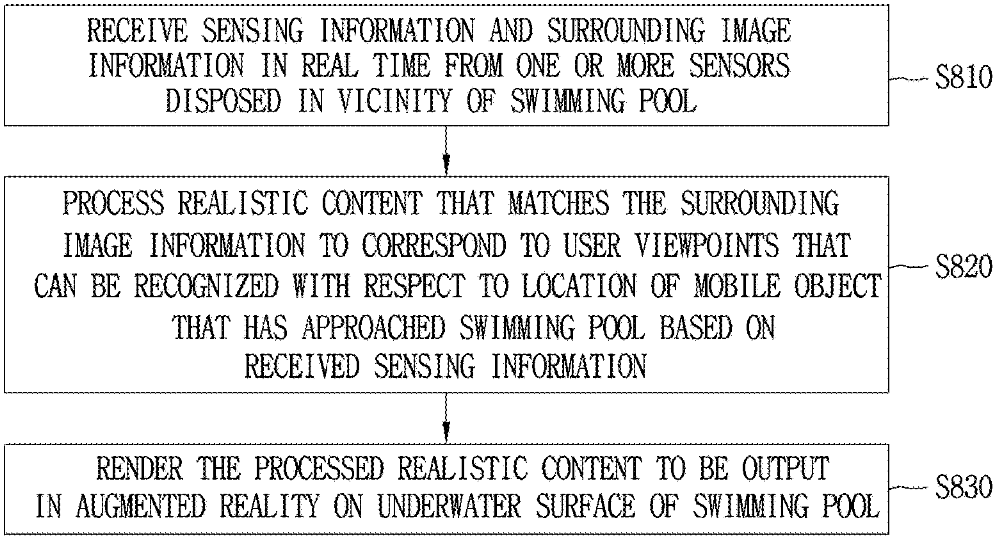
FIG. 8 is a flowchart showing a method of providing realistic content corresponding to surrounding structures corresponding to various user viewpoints related to the present disclosure.

FIG. 8 is a flowchart showing a method of providing realistic content corresponding to surrounding structures corresponding to various user viewpoints related to the present disclosure. Meanwhile, unless otherwise specified, each process shown in FIG. 8 may be performed through the processor of the realistic content providing device 100 according to the present disclosure (or another separate processor of the system 1000).

Referring to FIG. 8, first, the realistic content providing device 100 may receive sensing information and surrounding image information in real time from one or more sensors disposed in the vicinity of a swimming pool (S810).

According to an embodiment, a step S810 of receiving sensing information and surrounding image information may include acquiring the sensing information through at least one of a vision sensor, an environmental sensor, and an audio sensor disposed outside the swimming pool, and a temperature sensor, an acceleration sensor, an ultrasonic sensor, and a water pressure sensor disposed inside the swimming pool.

In addition, the step S810 of receiving sensing information and surrounding image information may include acquiring the surrounding image information through one or more background acquisition camera sensors disposed on an outer wall of a structure where the swimming pool is disposed or an outer wall of a surrounding structure.

Furthermore, according to an embodiment, the step S810 of receiving the sensing information and surrounding image information may include acquiring a plurality of image information items corresponding to a plurality of user viewpoints captured through a plurality of external cameras.

To this end, the plurality of background acquisition camera sensors may be disposed at different locations or disposed to be rotatable to acquire background images corresponding to various observer viewpoints so as to capture a structure in the vicinity of the swimming pool from various angles. For example, the background acquisition camera sensor may be a plurality of RGB cameras disposed in different locations and directions on an outer wall of the structure where the swimming pool is disposed and an outer wall of a surrounding structure.

In addition, based on the received sensing information, the processor 130 may process realistic content that matches the surrounding image information to correspond to (various) user viewpoints that can be recognized with respect to the location of the mobile object that has approached the swimming pool (S820).

Here, the processing of realistic content may denote the generating of one or more composite images by processing, combining, and editing a plurality of images with different viewpoints collected through the background image acquisition sensor 350. Furthermore, the processing of realistic content may refer to the processing of an image acquired by ultra-wide-angle shooting through the background image acquisition sensor 350.

According to an embodiment, a step S820 of processing the realistic content may include a process of generating a composite image for multi-view image information on the shape of a background structure in the vicinity of the structure in which the swimming pool is disposed, acquired through one of more background acquisition camera sensors.

For example, the processor may generate a first composite image based on first background image information acquired through a first camera disposed in a first direction on an outer wall of a structure where a swimming pool is disposed, and second background image information acquired through a second camera disposed in a second direction different from the first direction.

For example, the first composite image may be an image that combines some data extracted from the first background image information with some data extracted from the second background image information. Furthermore, the first composite image may be an image implemented to selectively or alternately output either one of the first background image information or the second background image information.

In addition, according to some embodiments, the step S820 of processing the realistic content may include a process of performing processing by extracting partial image data from the acquired plurality of image information items, respectively, and combining the respective extracted partial image data.

According to an embodiment, the respective partial image data is implemented such that an image from a corresponding viewpoint can be incident for each location of the mobile object. For example, it may be implemented such that an image corresponding to a viewpoint of a first observer is incident at a location of the first observer, and an image corresponding to a viewpoint of a second observer is incident at a location of the second observer.

In addition, in some embodiments, the step S820 of processing the realistic content may be a process of processing a composite image for an image in which part of the shape of the background structure is shown to extend to the underwater surface of the swimming pool, as a composite image for multi-view image information. To this end, the processor may determine a mapping area of a display to which a composite image is to be output, and perform the filtering and cropping of the composite image to be projected on the mapping area.

Subsequently, the processor may render the processed realistic content to be output in augmented reality on the underwater surface of the swimming pool (S830). According to an embodiment, the processor may render the generated composite image to be output in augmented reality on at least one of a side surface and a floor surface under water in the swimming pool and transmit it to the display.

Hereinafter, with reference to FIGS. 9A, 9B, 9C, 10A, and 10B, a process of implementing images from various viewpoints according to the location of a mobile object that has approached the vicinity of the swimming pool will be described using a more specific example.

Figure 9A:
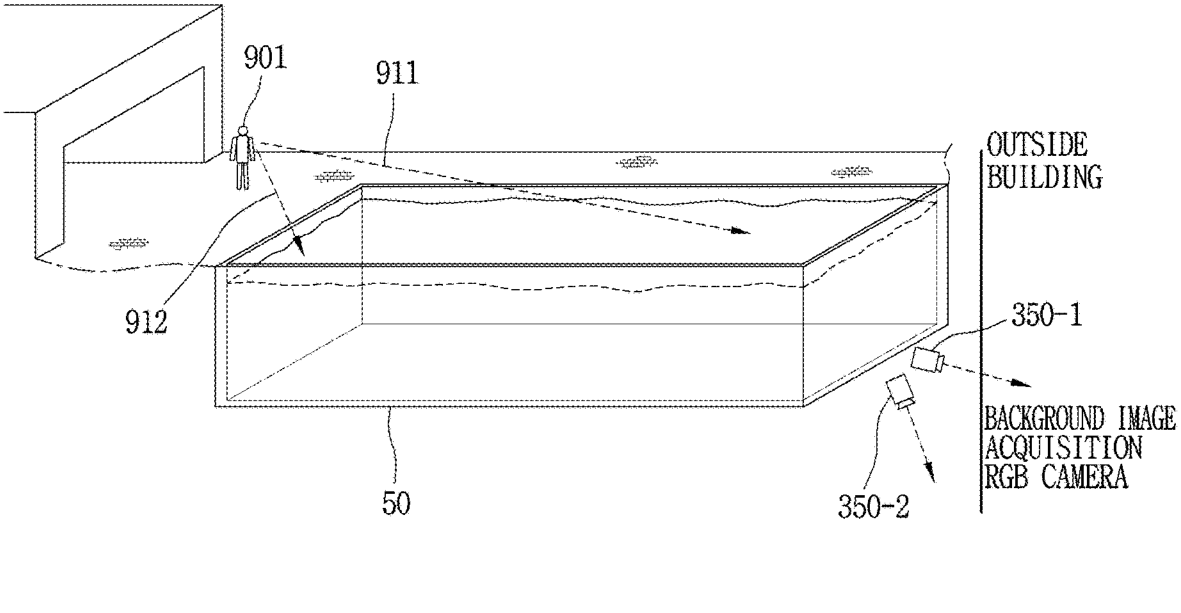
FIGS. 9A, 9B, 9C, 10A, and 10B are exemplary conceptual diagrams for explaining how to allow images from various viewpoints to be input depending on the location of a mobile object that has approached the vicinity of a swimming pool.

Referring to FIG. 9A, even for one observer 901 located in the vicinity of the swimming pool 50, a plurality of observer viewpoints 911, 912 occur.

Specifically, when it is assumed that the first viewpoint 911 and the second viewpoint 912 viewed by the observer 901 are not the same due to a size of the swimming pool 50, in a case where the same observer 901 looks at the swimming pool 50 from the first viewpoint 911 and in a case where the swimming pool 50 from the second viewpoint 912, different images must be incident on the observer 901 so as to avoid a sense of difference from the background of reality.

Accordingly, through the background image acquisition sensors 350, for example, the first camera 350-1 and the second camera 350-2, which are disposed on the outer wall of the structure, a first background image corresponding to the first viewpoint 911 and a second background image corresponding to the second viewpoint 912 are acquired, respectively.

The processor transmits the first background image corresponding to the first viewpoint 911 to displays on a wall surface and a floor surface in a left area under water in the swimming pool. Furthermore, the processor transmits the second background image corresponding to the first viewpoint 912 to displays on a wall surface and a floor surface in a right area under water in the swimming pool. Accordingly, even when the same observer 901 looks at the swimming pool 50 from different lines of sights, he or she may feel the extended background without any sense of difference from reality, and thus may experience a sense of space as if the swimming pool 50 is floating high in the air.

In order to output a multi-view image in this manner, the display according to the present disclosure may be implemented by applying a lenticular lens to a display module such as M-LED or OLED, for example, or as a light field (LF) display.

A lenticular lens is a special lens in the form of several semi-cylindrical lenses connected side by side, and the information of the pixels of the display 800 located behind the lens travels in different directions, and is incident on different observer viewpoints.

To this end, for example, sophisticated lenticular lenses with a diameter of about 0.5 mm in each 'convex' structure may be respectively disposed on a top of the display disposed on an underwater surface.

Figure 9B:
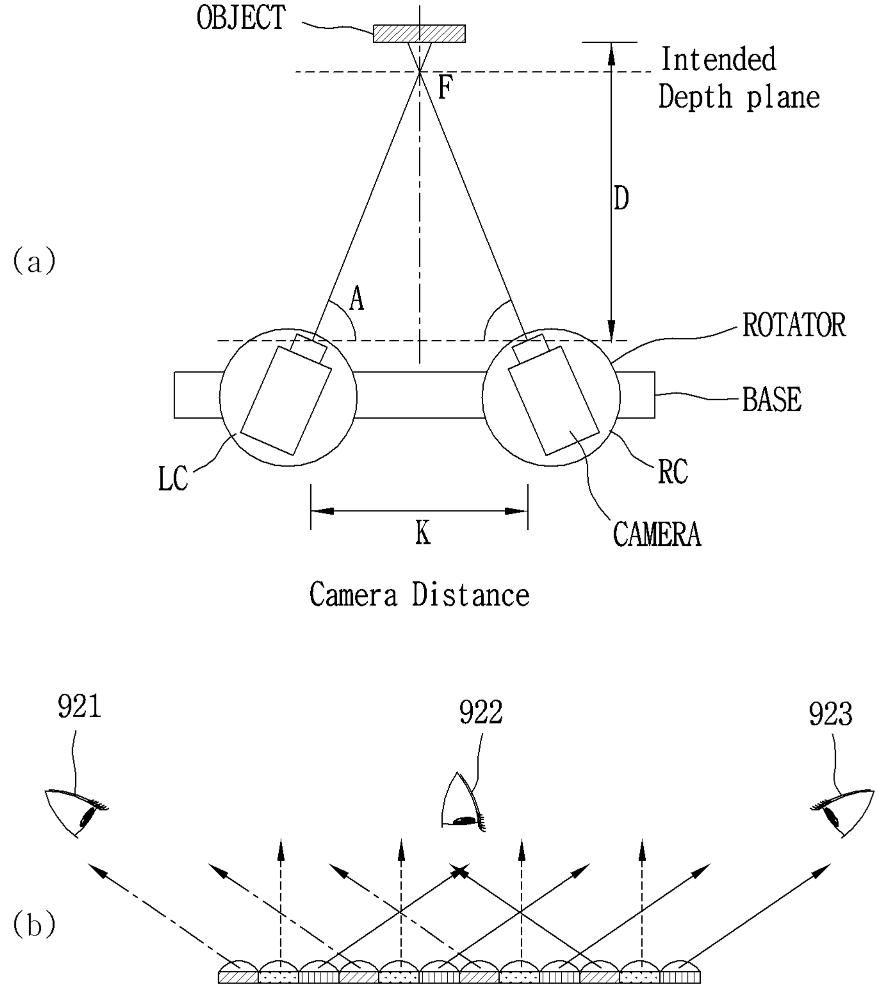

For example, as shown in (b) of FIG. 9B, at a first viewpoint 921, image data is incident in a left diagonal direction of the display to which the lenticular lens is applied. Furthermore, at a second viewpoint 922, image data is incident in a front direction of the display to which the lenticular lens is applied. Additionally, at the third viewpoint 923, image data is incident in a right diagonal direction of the display to which the lenticular lens is applied.

When implemented as a light field (LF) display, the display 800 may have a light field display module disposed on a floor surface and/or a side surface (either one or both side surfaces) under water in the swimming pool.

Furthermore, the display 800 may be configured as a light field display assembly including one or more light field display modules. Additionally, each light field display module may have a display area, and may be tiled to have an effective display area that is larger than that of the individual light field display modules.

In addition, it may be implemented such that the light field display module provides realistic content or a 3D holographic image to one or more mobile objects located within a viewing volume formed by the light field display module disposed on an underwater surface of the swimming pool according to the present disclosure.

Referring to (a) of FIG. 9B, a method of acquiring a stereoscopic (3D) image corresponding to realistic content or a 3D holographic image will be described as follows. First, the inputs of two cameras LC, RC are required to acquire a stereoscopic (3D) image. The two cameras LC, RC may be disposed to have a predetermined separation distance K, and a rotator may be provided to be rotatable based on each base.

In this manner, in a case where an object is captured through two cameras LC, RC, when an optical axis of the camera converges to a reference point F of an intended depth plane, a reliable sense of depth may be felt in a horizontal direction by adjusting a distance D such that the points of the object are closer or further away from the points of the intended depth plane.

By applying this method, slightly different images may be formed depending on the location of the observer's viewpoint to transmit stereoscopic (3D) realistic content or a 3D holographic image.

Figure 9C:
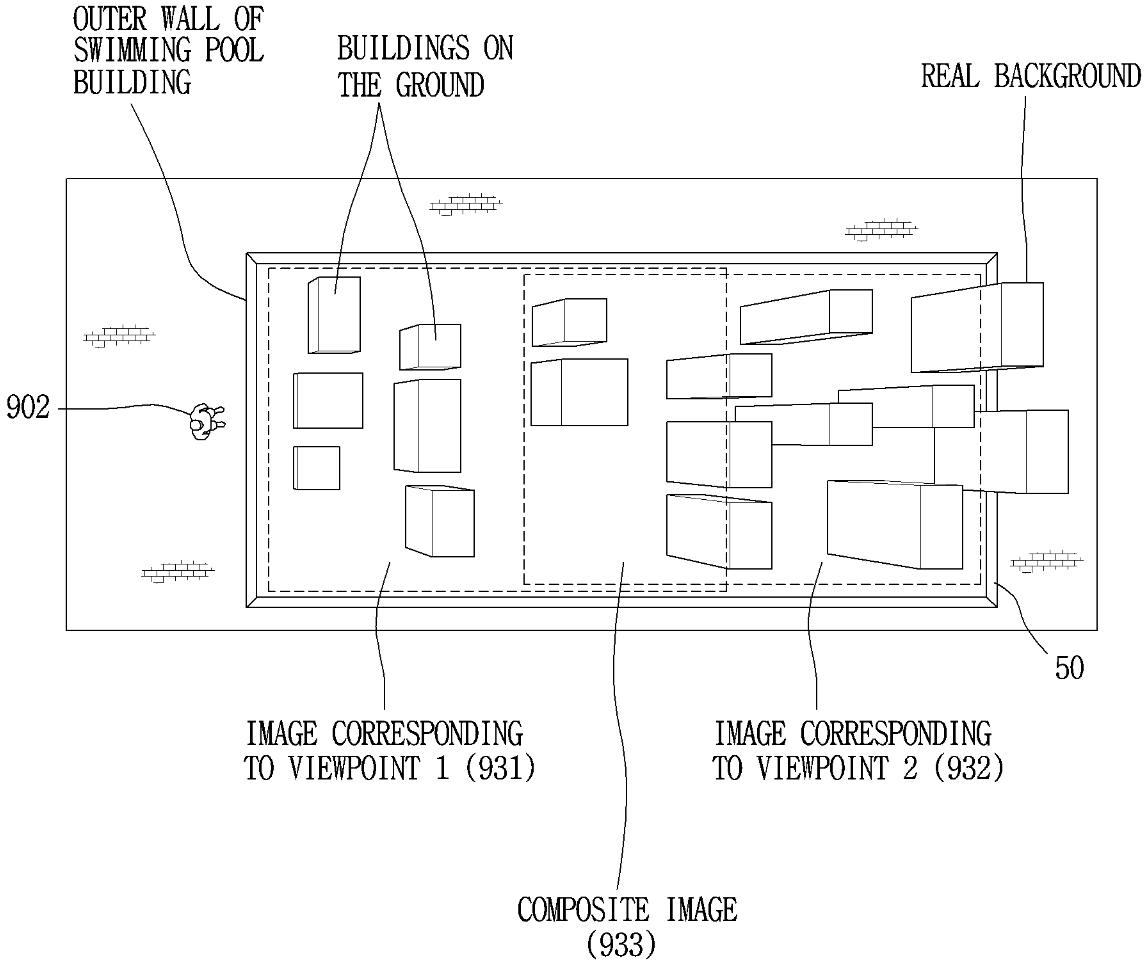

Meanwhile, as shown in FIG. 9C, when the observer 902 looks at the first viewpoint 911 of FIG. 9A from the outside of the swimming pool 50, a projected background image 932 corresponding thereto may be rendered and transmitted to the display. Additionally, when the observer 902 looks at the second viewpoint 912 of FIG. 9A from the outside of the swimming pool 50, a projected background image 931 corresponding thereto may be rendered and transmitted to the display.

In this case, the projected background images 931, 932 are edited/processed/combined so as to be seamlessly connected to a portion of the structure seen in reality so as to avoid a sense of difference from the background of reality.

Meanwhile, in FIG. 9C, when the observer 902 looks between the first viewpoint 911 and the second viewpoint 912 from the outside of the swimming pool 50, a composite image 933 for the projected background images 931, 932 may be rendered and transmitted.

According to an embodiment, the composite image 933 may be a composite image for multi-view image information on the shape of a background structure in the vicinity of the structure in which the swimming pool is disposed, acquired through one or more background acquisition camera sensors.

In addition, as a composite image for multi-view image information, the processor may process a composite image for an image in which part of the shape of the background structure is shown to extend to the underwater surface of the swimming pool so as to render the composite image to be output in augmented reality on at least one of a side surface and a floor surface under water in the swimming pool.

At this time, in order to avoid generating a sense of difference from the structure of reality, editing may be performed on background images captured from various angles based on a viewing range of the real structure corresponding to the location and height of the swimming pool 50.

Figure 10A:
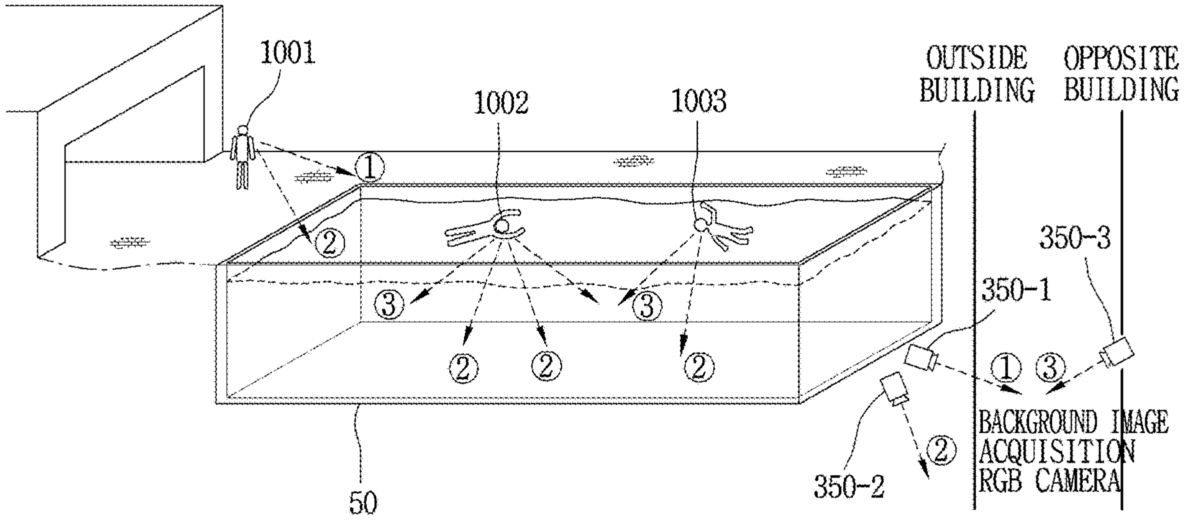

FIG. 10A is a view in which various viewpoints of a plurality of observers 1001, 1002, 1003, which are present in the vicinity of the swimming pool 50, are largely illustrated in three viewpoints. In FIG. 10A, in respective numbers ①②③ shown in the circle, it is assumed that the same number represents the same viewpoint. Each viewpoint also corresponds to a shooting angle ①②③ of the background image acquisition camera 350-1, 350-2, 350-3 disposed on the outer wall.

Meanwhile, in the case of a background image corresponding to a third viewpoint ③, it may be generated by combining images acquired through the camera 350-3 disposed on a wall of a structure (e.g., a building opposite thereto) adjacent to a structure where the swimming pool 50 is disposed.

Furthermore, in the case of a background image corresponding to a second viewpoint ②, image data acquired by the camera 350-2, which performs shooting at an angle that looks directly at a background structure from above, may be used. In addition, in the case of a background image corresponding to a first viewpoint ①, total reflection occurs due to a difference in refractive index between air and water, so it is sufficient to transmit an image acquired by another camera 350-1 disposed on an outer wall of the structure.

The processor may perform processing by acquiring a plurality of image information items corresponding to a plurality of user viewpoints captured through a plurality of external cameras through a communication module, extracting partial image data from the acquired plurality of image information items, respectively, and combining the respective extracted partial image data.

According to an embodiment, the combination of the respective partial image data is implemented such that an image from a corresponding viewpoint can be incident according to the location of the mobile object.

In this case, based on the sensing information of the sensor 300, in response to a mobile object being recognized as being located outside the swimming pool 50, the processor may be controlled to generate a composite image for respective images from different user viewpoints acquired by at least two of a plurality of external cameras (for background image acquisition), and transmit the generated composite image so as to be output in augmented reality on an underwater surface of the swimming pool.

On the contrary, based on the sensing information of the sensor 300, in response to a mobile object being recognized as being located inside the swimming pool 50, the processor may be controlled to transmit an image corresponding to a user viewpoint that looks directly at the ground from above acquired by at least one of a plurality of external cameras (for background image acquisition) so as to be output in augmented reality on an underwater surface of the swimming pool.

Figure 10B:
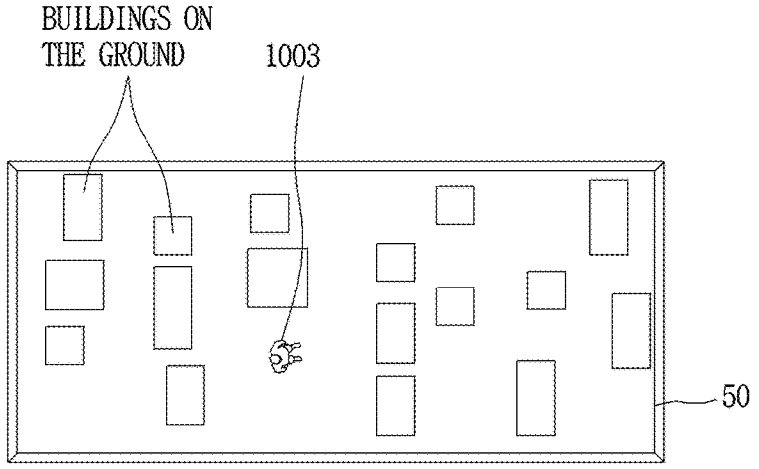

For example, as shown in FIG. 10B, when the observer 1003 looks at the floor inside the swimming pool, an image corresponding to a user viewpoint that looks directly at the ground from above acquired through the camera 350-2 disposed on the outer wall may be projected through the display.

Meanwhile, image information from various angles projected through the display is varied in real time based on image information acquired in real time through the background image acquisition camera 350. In addition, a more realistic background image may be provided by combining it with sensing data (e.g., ambient illuminance value) acquired by other sensors 300 disposed in the vicinity of the swimming pool.

In this manner, the realistic content providing device according to the present disclosure may transmit a background image connected to a structure in the vicinity of the swimming pool to an underwater surface in consideration of various viewpoints, thereby providing the observer with a sense of space and an experience as if floating in the air, no matter where he or she is in the swimming pool.

Figure 11:
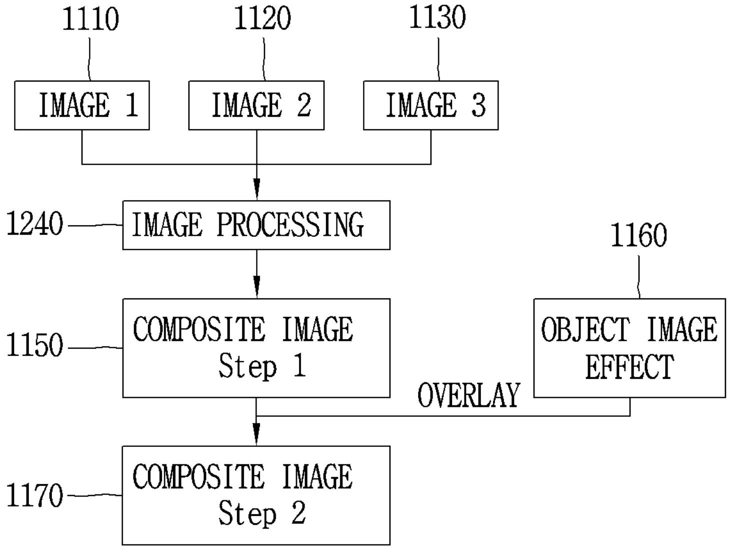
FIGS. 11 and 12 are conceptual diagrams for explaining how to generate a composite image in addition to images from various user viewpoints related to the present disclosure.
Figure 12:
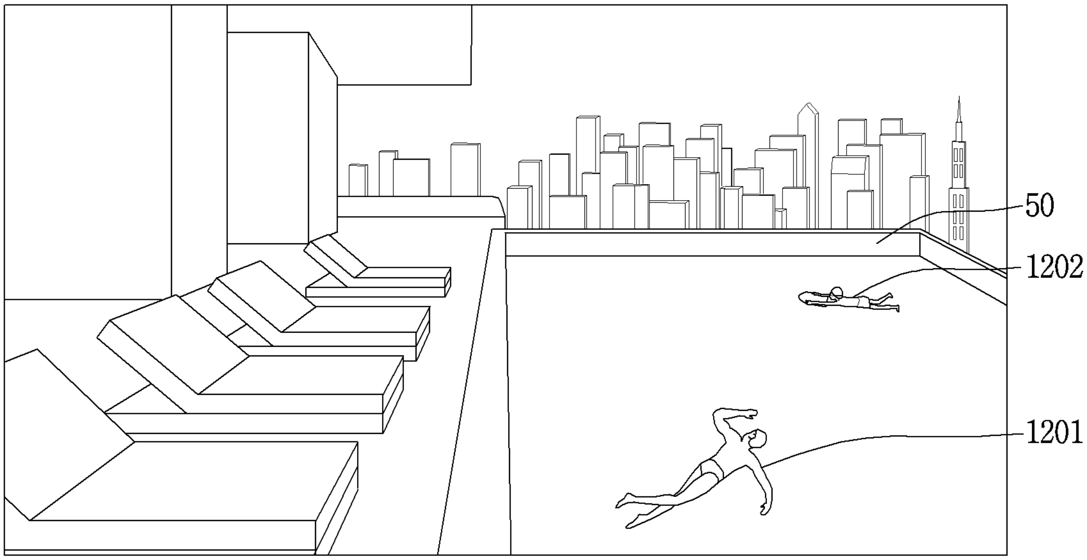
Figure 12:
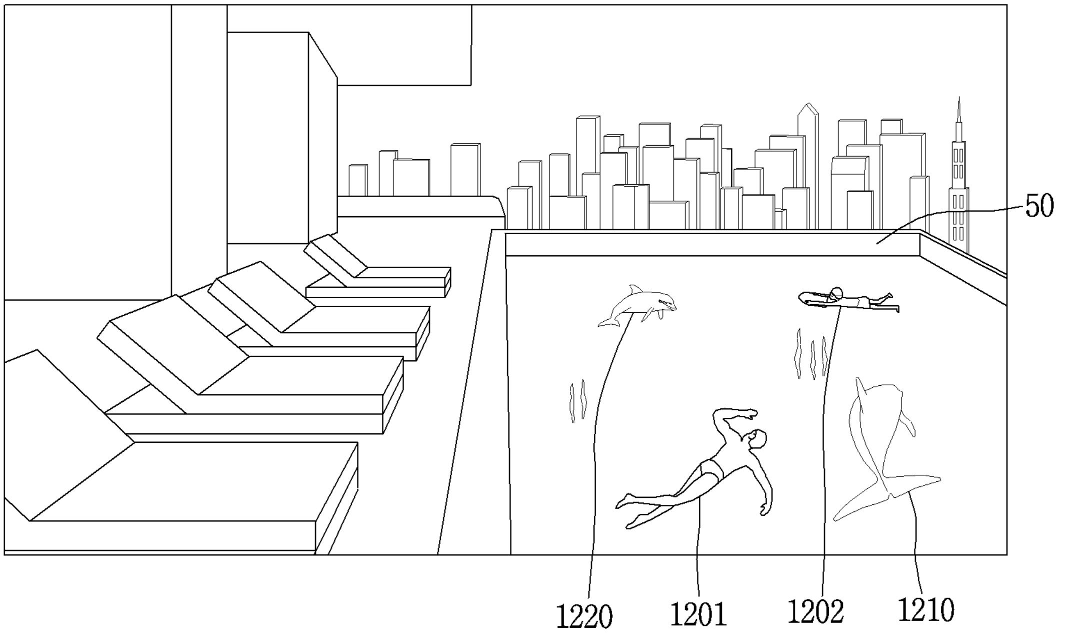

Next, FIGS. 11 and 12 are exemplary diagrams showing how composite images are additionally generated or provided together with other responsive objects to images from various user viewpoints related to the present disclosure.

The processor of the realistic content providing device according to the present disclosure may perform processing by acquiring a plurality of image information items corresponding to a plurality of user viewpoints captured through a plurality of external cameras through a communication module, extracting partial image data from the acquired plurality of image information items, respectively, and combining the respective extracted partial image data. Furthermore, in this case, the combination of the respective partial image data is implemented such that an image at a corresponding viewpoint can be incident according to the location of the mobile object.

In addition, the processor may generate, according to the location of the mobile object (or according to a viewpoint of the same mobile object), a first composite image such that images from a plurality of user viewpoints corresponding thereto can be incident, and generate a second composite image with respect to the first composite image may be generated on the basis of image information collected through a cloud server or memory.

Referring to FIG. 11, as a result of performing image processing 1240 for multi-viewpoint incidence on a plurality of images, for example, image-1 to image-3 1110, 1120, 1130 acquired through a plurality of background image acquisition cameras, composite image-1 1150 may be generated (step 1). The composite image-1 may be one of background images, which are incident on the above-described multi-viewpoints, respectively.

The processor may generate composite image-2 1170 by overlaying an additional object image effect 1160 on the composite image-1 1150 (step 2).

The composite image-2 1170 may be obtained by applying an additional effect to an image of a structure in the vicinity of the swimming pool, and for example, there may be a dynamic effect where one end of the swimming pool falls like a waterfall, a placement of a famous tourist building/sculpture, an effect in which a virtual animal is moving, an effect such as water being flushed toward a hole at a bottom of the swimming pool, and the like. Through this, the observer may be provided with an additional new experience.

FIG. 12 shows such additional composite images, which are provided together with observer-responsive objects. For example, in (a) of FIG. 12, when guests 1201, 1202 swimming in the swimming pool 50 are perceived on the basis of sensing data, responsive objects moving along them, respectively, may be provided as an additional object image effect.

For example, responsive object-1 1210 may be implemented to move in response to the first guest 1201 in the water, and responsive object-2 1220 may be implemented to move in response to the second guest 1202 in the water.

The responsive objects 1210, 1220 may be implemented as eye-shaped 3D holographic objects to make eye contact with the respective corresponding guests 1201, 1202.

Furthermore, when the responsive objects 1210, 1220 come into contact with the respective corresponding observers, a tactile surface may be generated using an underwater ultrasonic speaker.

Additionally, the respective corresponding guests 1201, 1202 may be implemented such that responsive objects 1210, 1220 can be assigned when linked with personal information.

As described above, according to a realistic content provision device and a realistic content provision method according to some embodiments of the present disclosure, responsive realistic content that can interact with surrounding objects or environments may be provided based on various sensing data items acquired by various sensors in the vicinity of a swimming pool, thereby providing a new spatial experience to an observer. In addition, the situation and situational change of one or more objects existing in the vicinity of a swimming pool may be perceived to provide realistic content that changes adaptively based thereon, thereby providing a sense of immersion and fun to an observer. Furthermore, it may provide personalized content or notify a dangerous situation more reliably. Moreover, a viewing space may be used for various marketing and information provision purposes. In addition, in consideration of various viewpoints, background images connected to structures in the vicinity of the swimming pool may be transmitted to an underwater surface, thereby providing the observer with a sense of space and an experience as if floating in the air, no matter where he or she is in the swimming pool. Moreover, observer-customized responsive realistic content may be provided together with image information from various viewpoints, thereby providing a completely new spatial experience and fun to a guest using the swimming pool.

Further scope of applicability of the present disclosure will become apparent from the foregoing detailed description. It should be understood, however, that the detailed description and specific embodiments, such as the preferred embodiment of the disclosure, are given by way of illustration only, since various changes and modifications within the concept and scope of the present disclosure will be apparent to those skilled in the art.

Features, structures, effects, and the like described in the embodiments above are included in at least one embodiment, and are not necessarily limited to only one embodiment. Furthermore, the features, structures, effects, and the like illustrated in each embodiment may be combined or modified for other embodiments by those skilled in the art to which the embodiments pertain. Therefore, contents related to such combinations and modifications should be construed as being included in the scope of the present disclosure.

In addition, although the embodiments have been described above, these are only examples and are not intended to limit the present disclosure, and it will be apparent to those skilled in this art that various modifications and applications may be made thereto without departing from the subject matter of the present disclosure. For example, each element illustrated in detail in the embodiments may be implemented in various modifications. Furthermore, all differences associated with the modifications and applications should be construed to be included in the scope of the present disclosure as defined in the accompanying claims.

The invention claimed is:

1. A realistic content provision device, the device comprising:

a communication module configured to communicate with a cloud server and receive sensing information from one or more sensors disposed in the vicinity of a swimming pool and surrounding image information captured through a plurality of external cameras disposed on an outer wall of a structure where the swimming pool is disposed or an outer wall of a surrounding structure;

a memory that stores realistic content and 3D data related thereto; and a processor that processes realistic content that matches the surrounding image information to correspond to a user viewpoint that can be recognized with respect to a location of a mobile object that has approached the vicinity of the swimming pool based on the received sensing information, and renders the processed realistic content to be output in augmented reality on an underwater surface of the swimming pool, wherein the processor acquires a plurality of image information items corresponding to a plurality of user viewpoints captured through the plurality of external cameras through the communication module, extracts partial image data from the acquired plurality of image information items, respectively, and combines the respective extracted partial image data to perform the processing, wherein the combination of the respective partial image data is implemented such that an image at a corresponding viewpoint is incident according to the location of the mobile object, wherein the realistic content that matches the surrounding image information is a composite image for multi-view image information on the shape of a background structure in the vicinity of the structure in which the swimming pool is disposed, acquired through the plurality of external cameras, and wherein the processor processes the composite image for an image in which part of the shape of the background structure is shown to extend to the underwater surface of the swimming pool, as the composite image for multi-view image information, and renders the composite image to be output in augmented reality on at least one of a side surface and a floor surface under water in the swimming pool.

2. The device of claim 1, wherein the sensing information is acquired through at least one of a vision sensor, an environmental sensor, and an audio sensor disposed outside the swimming pool, and a temperature sensor, an acceleration sensor, an ultrasonic sensor, and a water pressure sensor disposed inside the swimming pool.

3. The device of claim 1, wherein the processor determines a mapping area of a display to which the composite image is to be output, and wherein the processor performs filtering and cropping of the composite image to be projected on the mapping area.

4. The device of claim 1, wherein the processor controls an image corresponding to a user viewpoint that looks directly at the ground from above acquired by at least one of the plurality of external cameras to be transmitted on the basis of the mobile object being recognized to be located inside underwater in the swimming pool based on the sensing information so as to be output in augmented reality on an underwater surface of the swimming pool.

5. The device of claim 1, wherein the processor controls a composite image for respective images from different user viewpoints acquired by at least two of the plurality of external cameras to be generated and transmitted on the basis of the mobile object being recognized to be located outside underwater in the swimming pool based on the sensing information so as to be output in augmented reality on an underwater surface of the swimming pool.

6. The device of claim 1, wherein the processor generates, according to the location of the mobile object, a first composite image such that images from a plurality of user viewpoints corresponding thereto are incident, and generates a second composite image with respect to the first composite image on the basis of image information collected through the cloud server or the memory.

7. The device of claim 1, wherein the processor renders realistic content that matches the surrounding image information to be output in augmented reality through a light field (LF) display assembly including one or more LF display modules disposed on an underwater surface of the swimming pool, and the one or more LF display modules are configured to provide realistic content corresponding to the surrounding image information in a space inside the swimming pool to a mobile object that has approached the vicinity of the swimming pool.

8. A realistic content provision method, the method comprising:

receiving sensing information from one or more sensors disposed in the vicinity of a swimming pool and receiving surrounding image information surrounding image information captured through a plurality of external cameras disposed on an outer wall of a structure where the swimming pool is disposed or an outer wall of a surrounding structure;

processing, based on the received sensing information, realistic content that matches the surrounding image information to correspond to a user viewpoint that can be recognized with respect to a location of a mobile object that has approached the vicinity of the swimming pool; and rendering the processed realistic content to be output in augmented reality on an underwater surface of the swimming pool;

acquiring a plurality of image information items corresponding to a plurality of user viewpoints captured through the plurality of external cameras through the communication module; and extracting partial image data from the acquired plurality of image information items, respectively, and combines the respective extracted partial image data to perform the processing, wherein the combination of the respective partial image data is implemented such that an image at a corresponding viewpoint is incident according to the location of the mobile object, wherein the processing of the realistic content comprises:

generating a composite image for multi-view image information on the shape a background structure in the vicinity of the structure in which the swimming pool is disposed, acquired through the plurality of external cameras through the communication module; and processing the composite image for an image in which part of the shape of the background structure is shown to extend to the underwater surface of the swimming pool, as the composite image for the multi-view image information, and wherein the rendering step comprises rendering the composite image to be output in augmented reality on at least one of a side surface and a floor surface under water in the swimming pool.

9. The method of claim 8, wherein the receiving of the sensing information and the surrounding image information comprises:

acquiring the sensing information through at least one of a vision sensor, an environmental sensor, and an audio sensor disposed outside the swimming pool, and a temperature sensor, an acceleration sensor, an ultrasonic sensor, and a water pressure sensor disposed inside the swimming pool.

10. The method of claim 8, wherein the processing of the realistic content comprises:

determining a mapping area of a display to which the composite image is to be output; and performing filtering and cropping of the composite image to be projected on the mapping area.

* * * * *